United States Patent
Phan et al.

(10) Patent No.: US 10,906,709 B2
(45) Date of Patent: Feb. 2, 2021

(54) SYSTEMS AND METHODS FOR CONTAINERS WITH LOCKING LUG AND RECESS

(71) Applicant: REYNOLDS CONSUMER PRODUCTS LLC, Lake Forest, IL (US)

(72) Inventors: Wee Phan, Algonquin, IL (US); James Gomoll, Genoa City, WI (US); Toby Thomas, Pleasant Prairie, WI (US)

(73) Assignee: Pactiv LLC, Lake Forest, IL (US)

( * ) Notice: Subject to any disclaimer, the term of this patent is extended or adjusted under 35 U.S.C. 154(b) by 150 days.

(21) Appl. No.: 15/851,486

(22) Filed: Dec. 21, 2017

(65) Prior Publication Data

US 2018/0170629 A1 Jun. 21, 2018

Related U.S. Application Data

(60) Provisional application No. 62/437,649, filed on Dec. 21, 2016.

(51) Int. Cl.
*B65D 43/02* (2006.01)
*B65D 1/26* (2006.01)
(Continued)

(52) U.S. Cl.
CPC ........ *B65D 43/0233* (2013.01); *B29C 51/343* (2013.01); *B29C 51/44* (2013.01); *B65D 1/26* (2013.01); *B65D 43/16* (2013.01); *B65D 43/162* (2013.01); *B29K 2067/003* (2013.01); *B29L 2031/712* (2013.01); *B65D 2543/0062* (2013.01); *B65D 2543/00194* (2013.01); *B65D 2543/00296* (2013.01);
(Continued)

(58) Field of Classification Search
CPC .. B65D 43/0233; B65D 43/162; B65D 43/16; B65D 1/26; B65D 2543/00462; B65D 2543/00805; B65D 2543/0062; B65D 2543/00731; B65D 2543/00694; B65D 2543/00296; B65D 2543/00194; B29C 51/44; B29C 51/343; B29K 2067/003; B29L 2031/712
USPC .................................................. 220/810–835
See application file for complete search history.

(56) References Cited

U.S. PATENT DOCUMENTS 3,786,982 A     1/1974 Rakes et al.
4,124,141 A *  11/1978 Armentrout ............ B29C 66/21
                                                          220/783

(Continued)

OTHER PUBLICATIONS

International Search Report and Written Opinion dated Feb. 16, 2018 in International Application No. PCT/US2017/068010.

*Primary Examiner* — Kareen K Thomas
(74) *Attorney, Agent, or Firm* — Baker Botts L.L.P.

(57) ABSTRACT

Thermoformed locking assembly comprising a first web portion including locking lug having lug undercut defining a cantilevered lug ledge having lug engaging surface, second web portion including locking recess having recess undercut defining an opposing recess ledge having recess engaging surface and a lug stop opposite the recess undercut. Locking recess configured to receive locking lug and lug stop configured to position locking lug in locking recess with the lug engaging surface in engagement with the recess engaging surface when first web portion is moved towards second web portion.

31 Claims, 20 Drawing Sheets
(13 of 20 Drawing Sheet(s) Filed in Color)

(51) Int. Cl.
     *B65D 43/16*   (2006.01)
     *B29C 51/34*   (2006.01)
     *B29C 51/44*   (2006.01)
     *B29L 31/00*   (2006.01)
     *B29K 67/00*   (2006.01)

(52) U.S. Cl.
     CPC .............. *B65D 2543/00462* (2013.01); *B65D 2543/00694* (2013.01); *B65D 2543/00731* (2013.01); *B65D 2543/00805* (2013.01)

(56) References Cited

U.S. PATENT DOCUMENTS

| | | | |
|---|---|---|---|
| 4,466,552 A * | 8/1984 | Butterworth | A61L 2/26 206/439 |
| 4,555,043 A * | 11/1985 | Bernhardt | B65D 43/0218 220/257.1 |
| 4,560,082 A * | 12/1985 | Sutch | B29C 45/26 220/270 |
| 4,886,184 A * | 12/1989 | Chamourian | B65D 43/0212 220/781 |
| 5,046,659 A | 9/1991 | Warburton | |
| 5,092,479 A * | 3/1992 | Wells | B65D 43/162 206/518 |
| 5,169,014 A | 12/1992 | Hexamer | |
| 5,249,694 A * | 10/1993 | Nelson | B65D 43/0206 220/266 |
| 5,356,017 A | 10/1994 | Rohr et al. | |
| 5,507,406 A * | 4/1996 | Urciuoli | B65D 43/021 215/209 |
| 5,584,408 A | 12/1996 | Orkisz | |
| 5,791,509 A * | 8/1998 | Rush | B65D 43/0212 206/508 |
| 5,897,011 A * | 4/1999 | Brilliant | B65D 43/162 220/266 |
| 6,460,716 B1 * | 10/2002 | Wong | B65D 21/022 220/4.24 |
| 6,923,338 B2 * | 8/2005 | Dees | B65D 11/188 220/4.24 |
| 7,097,066 B2 * | 8/2006 | Tucker | B65D 21/0222 206/508 |
| 9,132,942 B2 * | 9/2015 | Nikaein | B65D 43/0249 |
| 9,187,209 B1 * | 11/2015 | Hanna | B65D 43/162 |
| 2009/0090712 A1 * | 4/2009 | Vovan | B65D 21/02 220/23.86 |
| 2014/0284346 A1 | 9/2014 | McCumber et al. | |

* cited by examiner

SYSTEMS AND METHODS FOR CONTAINERS WITH LOCKING LUG AND RECESS

CROSS REFERENCE TO RELATED APPLICATION

The present application claims priority to U.S. Provisional Application Ser. No. 62/437,649 filed Dec. 21, 2016, the contents of which is incorporated herein by reference in its entirety.

FIELD OF THE APPLICATION

The disclosed subject matter relates to a thermoformed locking assembly, and articles, such as a container, having a thermoformed locking assembly.

DESCRIPTION OF THE RELATED ART

Articles, such as containers, are frequently made by thermoforming a web of material. Articles so produced can, for example, be used for shipping, storing, preparing and/or serving a wide range of food items, such as an egg carton for eggs or a cake container for cakes. It is beneficial, or perhaps necessary, for such thermoformed containers to be capable of being locked closed.

Although various locking assemblies are known, there remains a need for a thermoformed locking assembly and articles, such as a container, having a thermoformed locking assembly that can be securely locked closed, but readily opened when desired.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages, and in accordance with the purpose of the disclosed subject matter, as embodied and broadly described, the disclosed subject matter includes a thermoformed container including a base having a base flange and a lid having a lid flange. The lid is configured to be moved relative to the base between a closed position and an open position. The lid flange is adjacent to the base flange when in the closed position. At least one of the base flange or the lid flange is formed to include a locking lug having a lug undercut defining a cantilevered lug ledge having a lug engaging surface. The other of the base flange or lid flange is formed to include a locking recess having a recess undercut defining an opposing recess ledge having a recess engaging surface and a lug stop opposite the recess undercut. The locking recess is aligned to receive the locking lug and the lug stop is configured to position the locking lug in the locking recess such that the lug engaging surface is in engagement with the recess engaging surface to define a locking assembly when the base and lid are in the closed position.

Additionally, and as embodied herein, the lid can be hingedly connected to the base by a hinge. The hinge can be disposed on an opposite side of the container as the locking lug and locking recess. Alternatively, as further embodied herein, the base and the lid can be two separate members to allow removal of the lid when the lid is moved to the open position.

Furthermore, and as embodied herein, a minimum closing force can be applied to move the lid into the closed position with the lug engaging surface in engagement with the recess engaging surface, and a minimum opening force can be applied to move the lug engaging surface out of engagement with the recess engaging surface. The minimum opening force can be greater than the minimum closing force. The cantilevered lug ledge and the opposing recess ledge can each have an outer edge, and at least one outer edge can be chamfered or rounded to maintain the desired minimum closing force required to move the lid into the closed position with the lug engaging surface in engagement with the recess engaging surface.

In addition, and as embodied herein, the locking lug can include stiffening ribs along two sides of the locking lug. The locking recess likewise can include stiffening ribs along two sides of the locking recess. As additionally embodied herein, the locking lug can be generally L-shaped in cross section. Likewise, the locking lug can be provided with a single-sided configuration, wherein a lug undercut is provided only on one side of the locking lug. Similarly, the locking recess can be single-sided with the recess undercut on one side of the locking recess. In this manner, the locking lug and recess can be provided in a relatively small space, so as to be incorporated on containers of smaller size and reduced web thickness, without compromising the integrity of the minimum closing and opening forces as desired. As further embodied herein, the locking lug can include a ramp to reduce stack height.

In accordance with another aspect of the disclosed subject matter, a method of forming a thermoformed locking assembly, or an article, such as a container, having such locking assembly is provided. The thermoformed locking assembly includes a locking lug having an undercut defining a cantilevered lug ledge having a lug engaging surface and a locking recess having an undercut defining an opposing recess ledge having a recess engaging surface and a lug stop opposite the recess undercut. The method of forming the thermoformed locking assembly includes providing a mold having a mold surface with a moveable locking lug mold portion and a moveable locking recess mold portion. Each of the moveable locking lug mold portion and the moveable locking recess mold portion is moveable between a mold condition aligned with the mold surface and a retracted condition below the mold surface. The moveable locking lug mold portion has an upper surface with a cavity defined therein corresponding in shape to at least a portion of the locking lug. The moveable locking lug mold portion has a lug undercut mold member slidably mounted on an angled surface of the moveable locking lug mold portion with the lug undercut mold member having a flange corresponding to the lug undercut. The moveable locking recess mold portion has a protrusion extending above the mold surface when the moveable locking recess mold portion is in the mold condition. The protrusion corresponds in shape to at least a portion of the locking recess. The moveable locking recess mold portion has a recess undercut mold member slidably mounted on an angled surface of the moveable locking recess portion with the recess undercut mold member having a flange corresponding to the recess undercut.

The method includes positioning at least one web of thermoformable material on the mold surface with a first web portion proximate the moveable locking lug mold portion and a second web portion proximate the moveable locking recess mold portion and with both the moveable locking lug mold portion and moveable locking recess mold portion in the mold condition. For example, a single web can be positioned on both the moveable locking lug mold portion and the moveable locking recess mold portion if a single piece construction is desired. Alternatively, separate webs can be positioned on the moveable locking lug mold portion and moveable locking recess mold portion, respectively, if a two-piece construction is preferred. As disclosed in further detail, a web of less thickness can be used due to the mold of the disclosed subject matter. The method further includes thermoforming the at least one web to form an article including a locking lug and a locking recess. The locking lug has an undercut defining a cantilevered lug ledge having a lug engaging surface formed by the moveable locking lug mold portion. The locking recess has an undercut defining an opposing recess ledge having a recess engaging surface and a lug stop opposite the recess undercut formed by the moveable locking recess mold portion. The method further includes retracting the moveable locking lug mold portion and the moveable locking recess mold portion to the retracted condition. The lug undercut mold member slides along the angled surface of the moveable locking lug mold portion to release the lug undercut when the moveable locking lug mold portion is moved towards the retracted condition. The recess undercut mold member slides along the angled surface of the moveable locking recess mold portion to release the recess undercut when the moveable locking recess mold portion is moved towards the retracted condition.

Additionally, and as embodied herein, the lug undercut mold member can be biased towards an initial position. The lug undercut mold member can slide along the angled surface of the moveable locking lug mold portion against the bias until the lug undercut is released returning the lug undercut mold member to the initial position.

Furthermore, and as embodied herein, the recess undercut mold member can be biased towards an initial position. The recess undercut mold member can slide along the angled surface of the moveable locking recess mold portion against the bias until the recess undercut is released returning the recess undercut mold member to the initial position.

In accordance with another aspect of the disclosed subject matter, a thermoformed locking assembly is provided. The thermoformed locking assembly comprises a locking lug and a locking recess having one or more of the features set forth above, and as further described in detail herein.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

The application file contains at least one drawing executed in color. Copies of this patent with color drawings will be provided by the Office upon request and payment of the necessary fee.

DETAILED DESCRIPTION

Figure 1:
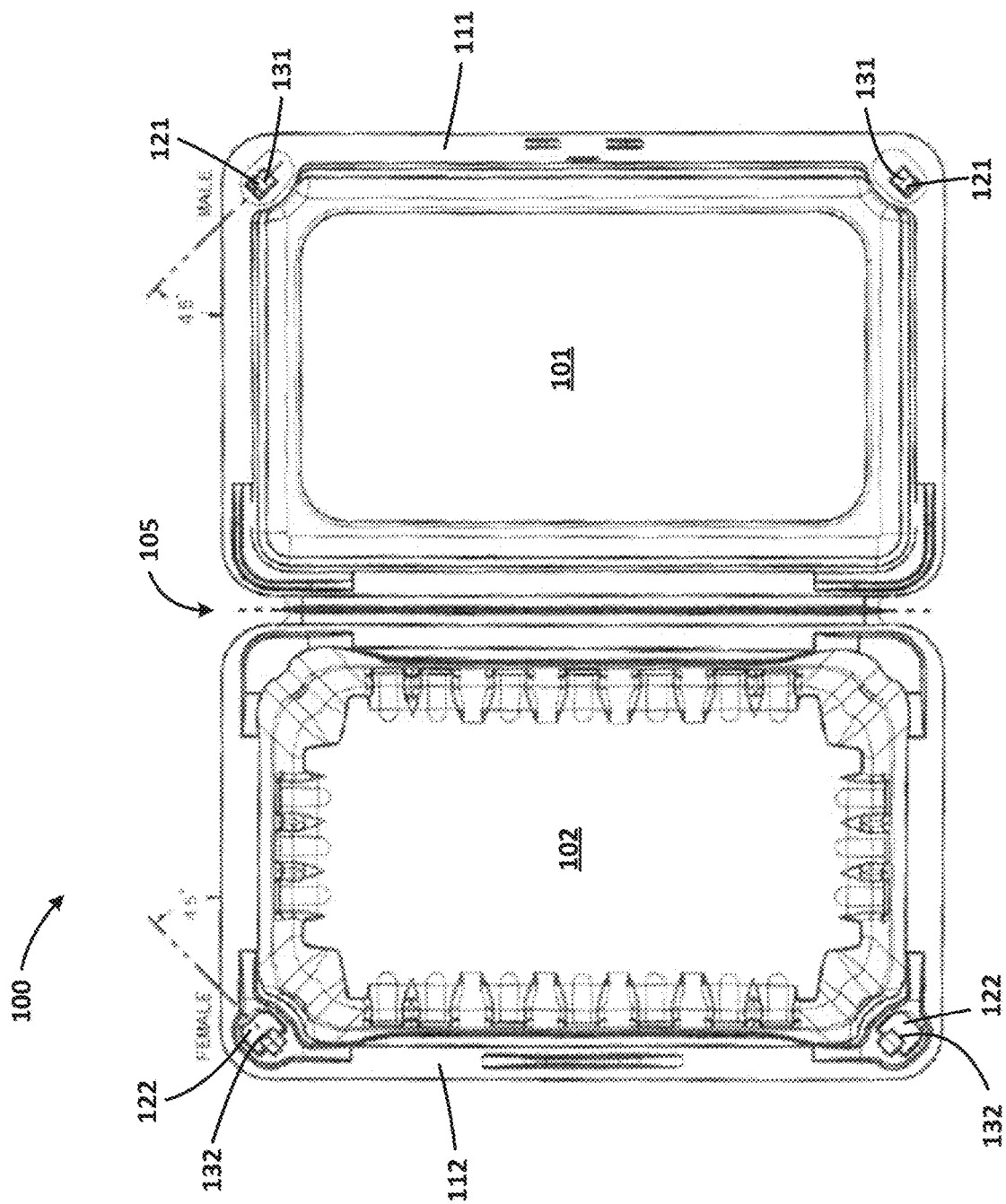
FIG. 1 is a plan view of an exemplary embodiment of a container in accordance with the disclosed subject matter in an open position.

The apparatus and methods presented herein may be used for storage, transportation, and display of various products, such as food items and other perishable and nonperishable products. The disclosed subject matter is particularly suited for storage, transportation, and display of food items, wherein the container lid and base provide a locking assembly to allow easy locking and release of the lid.

In accordance with the disclosed subject matter, as embodied and broadly described, the disclosed subject matter includes a thermoformed container including a base having a base flange and a lid having a lid flange. The lid is configured to be moved relative to the base between a closed position and an open position. For example, and as set forth in detail below, the lid can be hingedly connected to the base to form a container with one-piece construction, or the lid can be a separate member to form a container with two-piece construction if preferred. The lid flange is adjacent to the base flange when in the closed position. At least one of the base flange or the lid flange is formed to include a locking lug having a lug undercut defining a cantilevered lug ledge having a lug engaging surface. The other of the base flange or lid flange is formed to include a locking recess having a recess undercut defining an opposing recess ledge having a recess engaging surface and a lug stop opposite the recess undercut. The locking recess is aligned to receive the locking lug and the lug stop is configured to position the locking lug in the locking recess to define a locking assembly in accordance with the disclosed subject matter, such that the lug engaging surface is in engagement with the recess engaging surface when the base and lid are in the closed position.

Reference will now be made in detail to the various exemplary embodiments of the disclosed subject matter, exemplary embodiments of which are illustrated in the accompanying drawings. The structure and corresponding methods of operation of the disclosed subject matter will be described in conjunction with the detailed description of the systems.

The accompanying figures, where like reference numerals refer to identical or functionally similar elements throughout the separate views, serve to further illustrate various embodiments and to explain various principles and advantages all in accordance with the disclosed subject matter. For purpose of explanation and illustration, and not limitation, exemplary embodiments of the container, and of the locking assembly, in accordance with the disclosed subject matter are shown in FIGS. 1-16. The container is suitable for use with a wide variety of perishable and nonperishable products. For example, and without limitation, the container can be used for shipping, serving, storing, preparing and/or re-using food items, such as an egg carton for eggs or a cake container for cakes.

Figure 2:
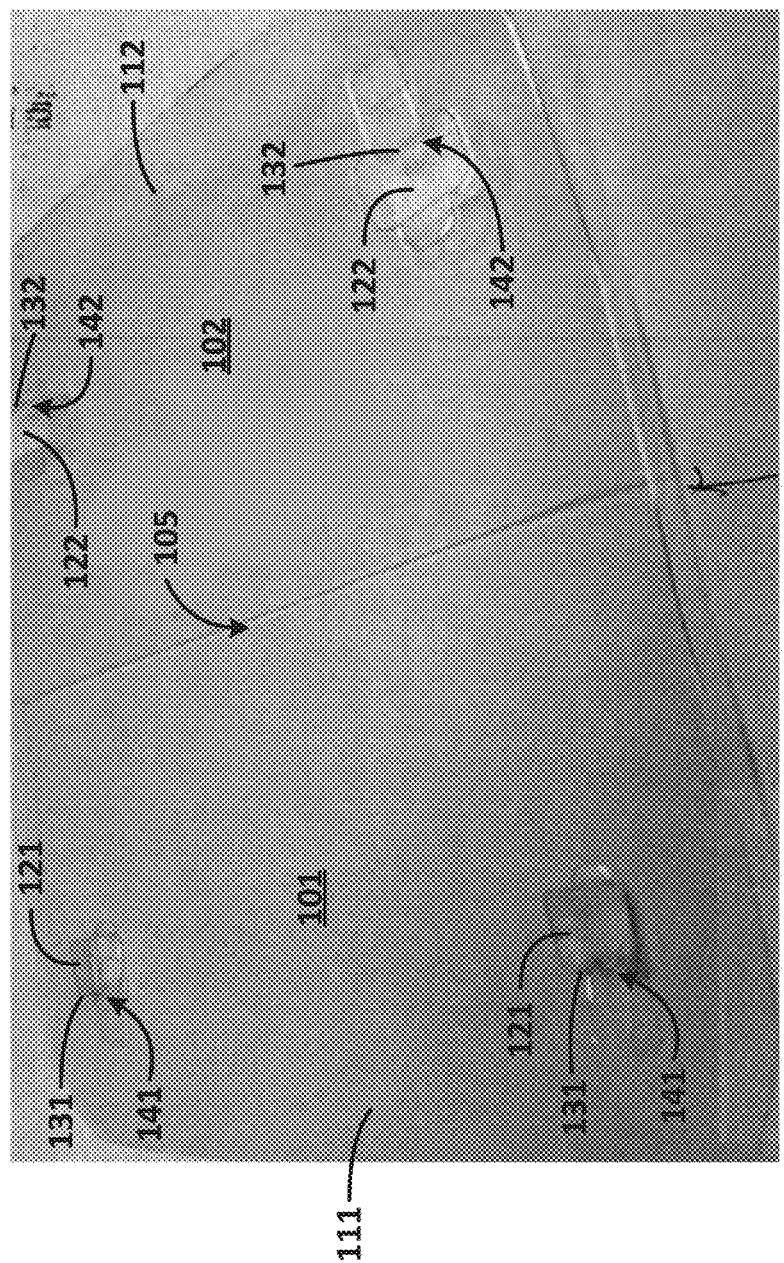
FIG. 2 is a perspective view of another exemplary embodiment of a container in accordance with the disclosed subject matter in an open position.

For purpose of illustration, and not limitation, reference is now made to FIGS. 1 and 2 illustrating a thermoformed container 100, according to an exemplary embodiment of the disclosed subject matter. As embodied herein, the thermoformed container 100 includes a base 101 having a base flange 111 and a lid 102 having a lid flange 112. The base flange 111 and the lid flange 112 can extend outwardly from the base 101 and the lid 102, respectively. At least one of the base flange 111 or lid flange 112 is formed to include a locking lug 121. The locking lug 121 has a lug undercut 131 defining a cantilevered lug ledge having a lug engaging surface 141. The other of the base flange 111 or the lid flange 112 is formed to include at least one locking recess 122. The locking recess 122 has a recess undercut 132 defining an opposing recess ledge having a recess engaging surface 142 and a lug stop 192 opposite the recess under cut 132. For purpose of explanation and illustration, and not limitation, as embodied herein, the thermoformed container 100 can have two locking lugs 121 each disposed proximate a corner of the base flange 111, and two locking recesses 122 each disposed in a corresponding corner of the lid flange 112. As described herein, locking recess 122 is aligned to receive locking lug 121 and lug stop 192 is configured to position the locking lug 121 with the lug engaging surface 141 in engagement with the recess engaging surface 142 when the lid is moved into the closed position.

Figure 3A:
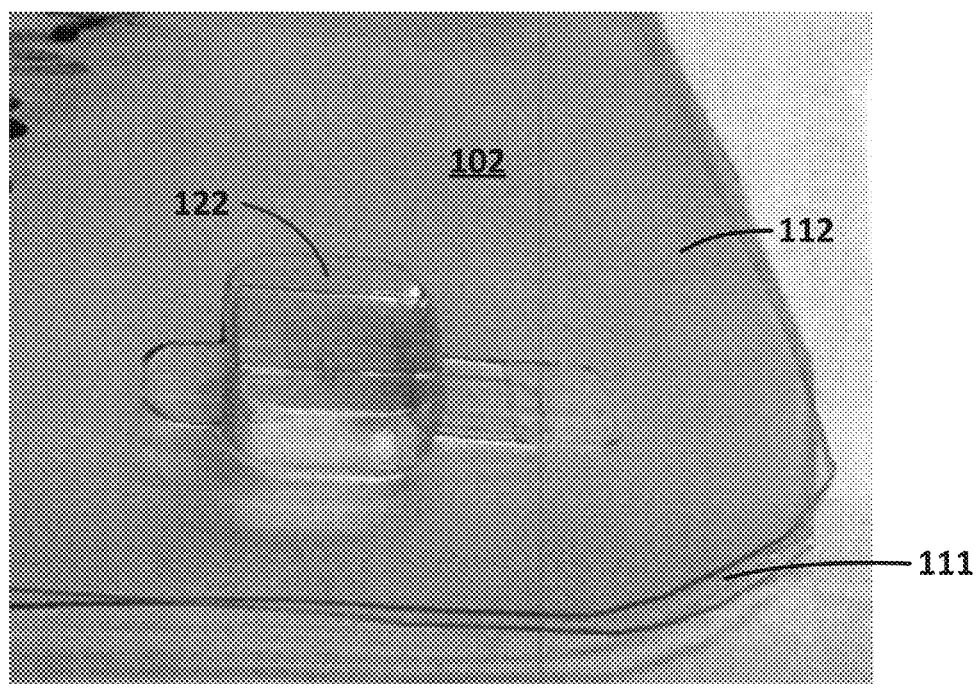
FIG. 3A is a bottom perspective view of an exemplary locking lug and recess of the container of FIG. 2 in a closed position.
Figure 3B:
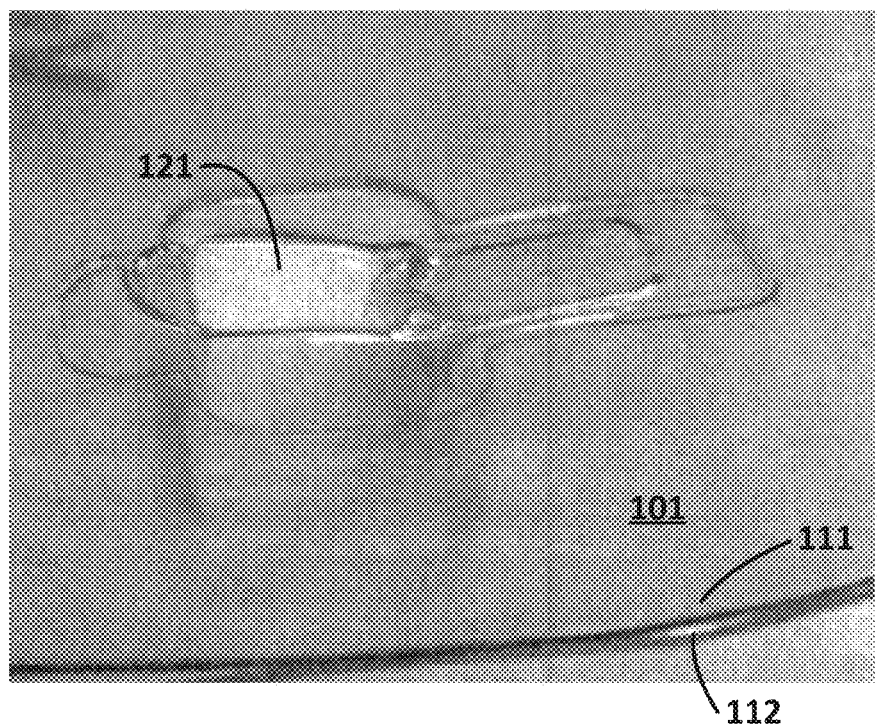
FIG. 3B is a top perspective view of the locking lug and recess of the container of FIG. 3A in the closed position.

The lid 102 is configured to be moved relative to the base 101 between a closed position and an open position. Reference is now made to FIGS. 3A and 3B, the base 101 and lid 102 are shown in a closed position. The lid flange 112 is adjacent to the base flange 111 when the base 101 and the lid 102 are in the closed position. The locking recess 122 is aligned to receive the locking lug 121 such that the lug engaging surface 141 is in engagement with the recess engaging surface 142 when the base 101 and lid 102 are in the closed position.

Figure 12:
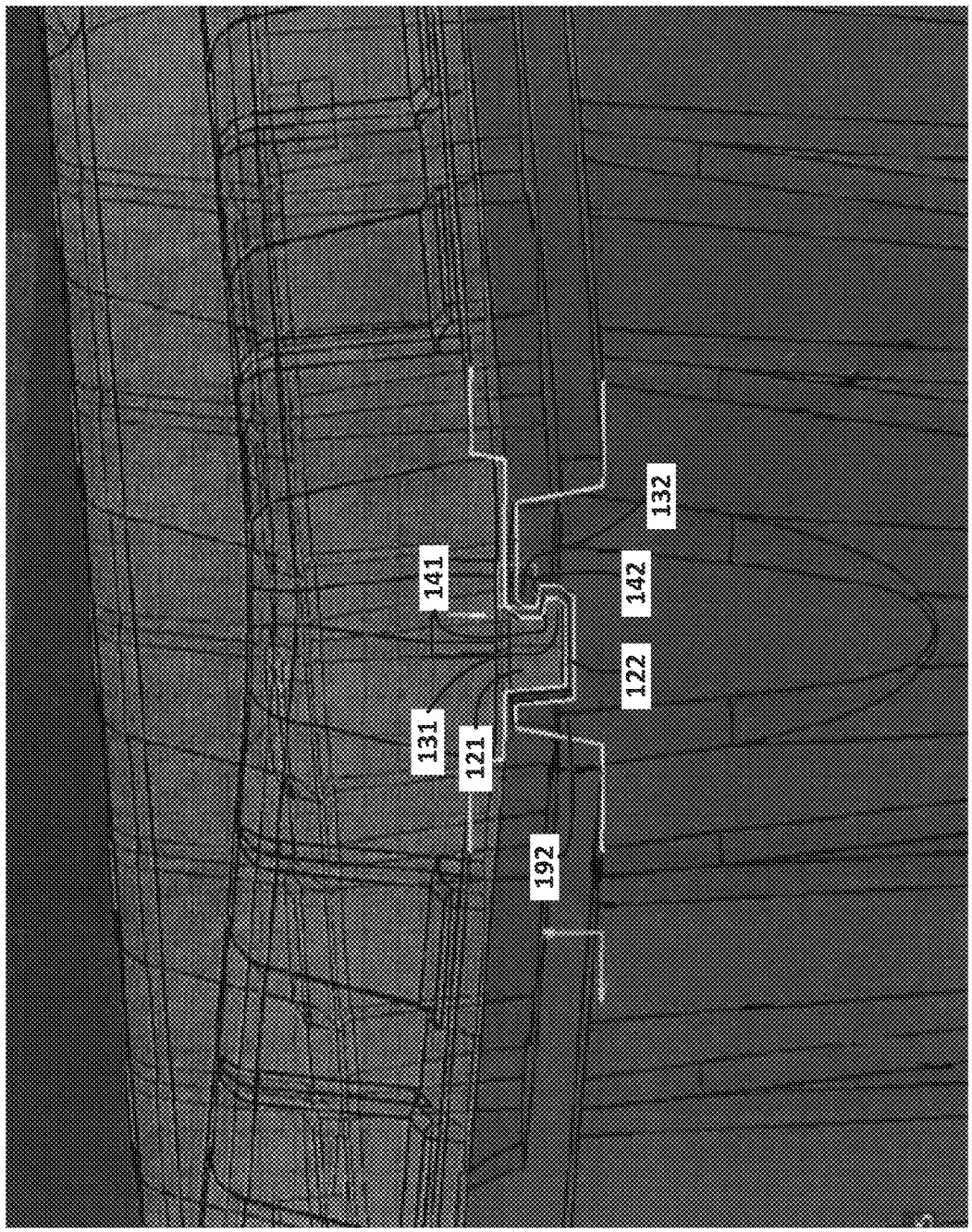
FIG. 12 is a perspective view of the container of FIG. 1 in a closed position, with portions cut away to show an exemplary locking lug in engagement with an exemplary locking recess in accordance with the disclosed subject matter.

Reference is now made to FIG. 12, showing lug stop 192 opposite the recess undercut 132. Lug stop 192 can be configured to position the locking lug in the locking recess with the lug engaging surface in engagement with the recess engaging surface when the lid is moved into the closed position. The lug stop 192 can be configured such that little or no clearance is provided at the back of the locking lug 121 when the lid is moved into the closed position with the cantilevered lug ledge positioned under the undercut of the opposing locking recess ledge and the lug engaging surface in engagement with the recess engaging surface. As further embodied herein, the lug stop 192 can reduce or prevent movement and inadvertent release of the locking lug 121 from the lug recess 122 when in the closed position. For purpose of example and not limitation, lug stop 192 can be made vertical to facilitate molding of the locking recess.

Additionally, and as embodied herein, the lid 102 can be hingedly connected to the base 101 by a hinge 105. The hinge 105 can be disposed on an opposite side of the container as the locking lug 121 and locking recess 122. Alternatively, as further embodied herein, the base 101 and the lid 102 can be configured to allow removal of the lid 102 when the lid is moved to the open position, such as by providing a frangible hinge to tear off the lid 102 from the base 101, or by forming the base 101 and lid 102 as separate members. Furthermore, a plurality of locking lugs 121 and a corresponding plurality of locking recesses 122 can be provided. For example, if the lid 102 is hingedly connected to the base 101 to form a one-piece construction, two locking lugs 121 and two locking recesses 122 can be provided, such as disposed on an opposite side of the container as the hinge 105. Alternatively, if a two-piece construction is desired, a plurality of locking lugs 121 and corresponding locking recesses 122 can be provided, such as disposed at each corner of the container and/or along one or more edges.

Furthermore, and as embodied herein, a minimum closing force can be applied to move the lid 102 into the closed position with the lug engaging surface 141 in engagement with the recess engaging surface 142, and a minimum opening force can be applied to move the lug engaging surface 141 out of engagement with the recess engaging surface 142. The minimum opening force can be greater than the minimum closing force.

Figure 4A:
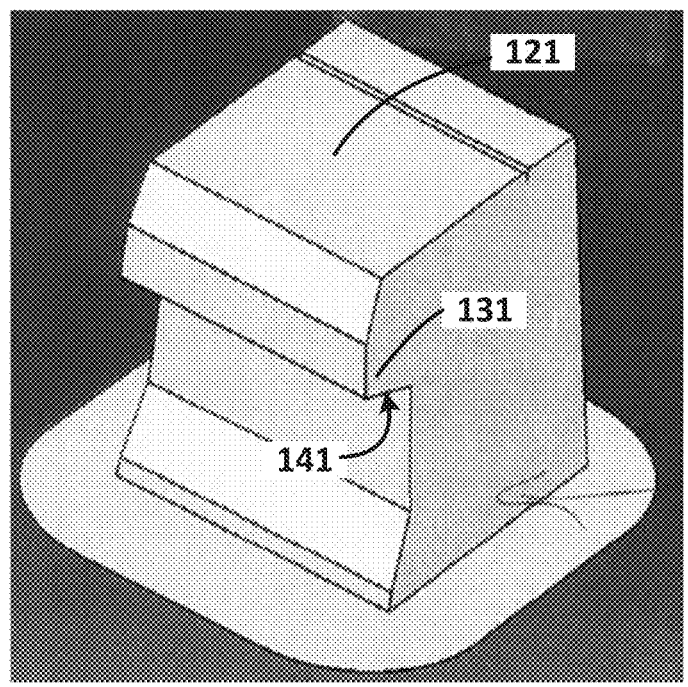
FIG. 4A is a perspective view of another exemplary locking lug in accordance with the disclosed subject matter, a complementary locking recess (not shown) being a mirror image of the locking lug.
Figure 4B:
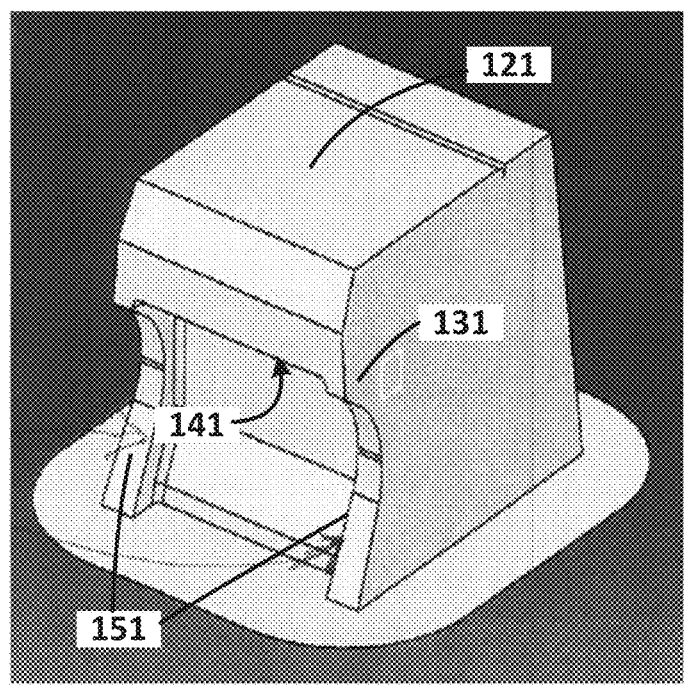
FIG. 4B is a perspective view of another exemplary locking lug in accordance with the disclosed subject matter, a complementary locking recess (not shown) being a mirror image of the locking lug.
Figure 5A:
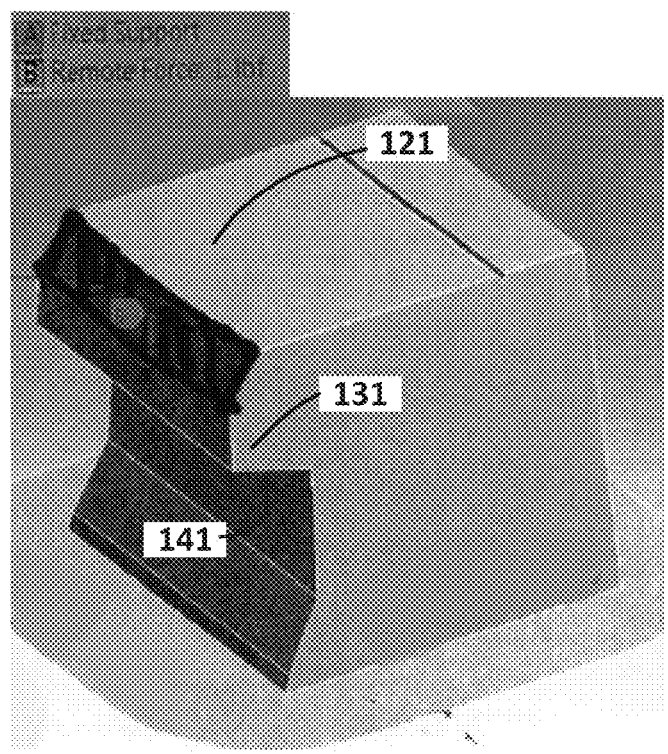
FIG. 5A is a perspective view of the locking lug of FIG. 4A, showing a finite element analysis to illustrate additional details of the locking lug in accordance with the disclosed subject matter.
Figure 5B:
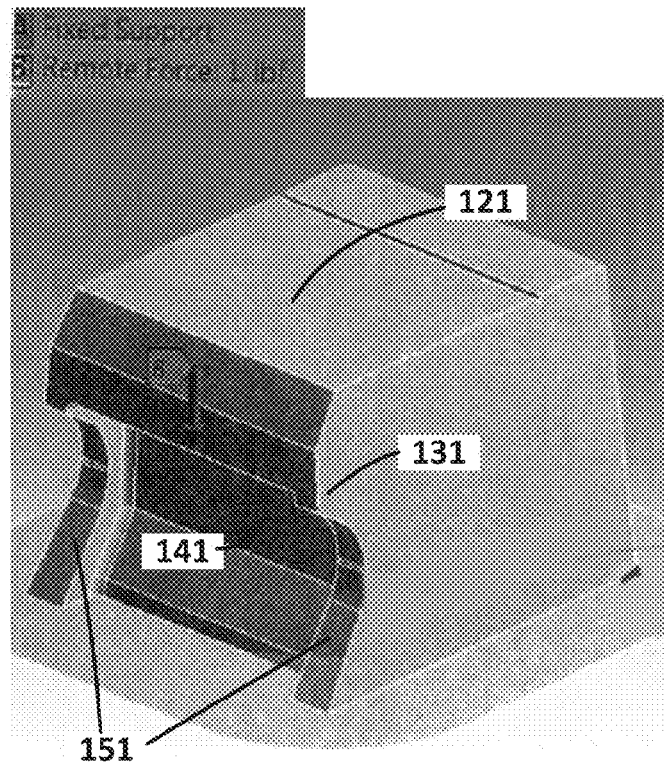
FIG. 5B is a perspective view of the locking lug of FIG. 4B, showing a finite element analysis to illustrate additional details of the locking lug in accordance with the disclosed subject matter.
Figure 6A:
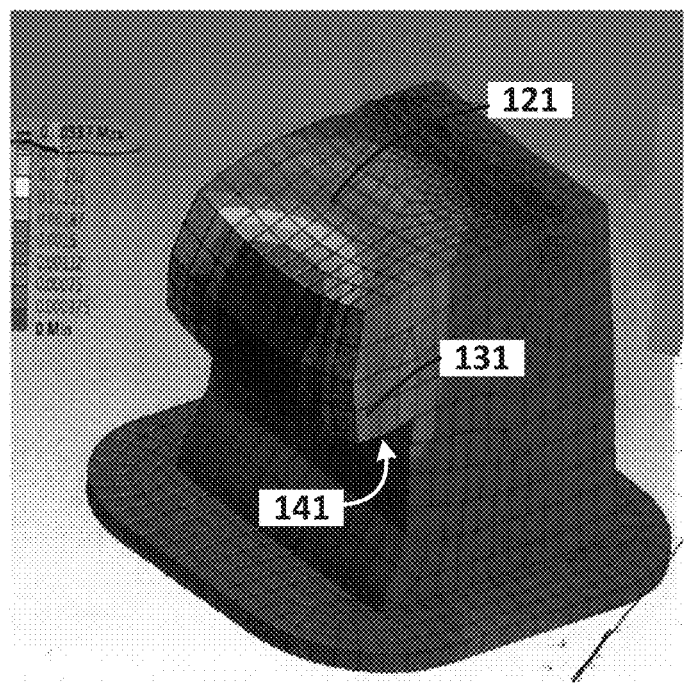
FIG. 6A is a perspective view of the locking lug of FIG. 4A, showing a finite element analysis to illustrate additional details of the locking lug in accordance with the disclosed subject matter.
Figure 6B:
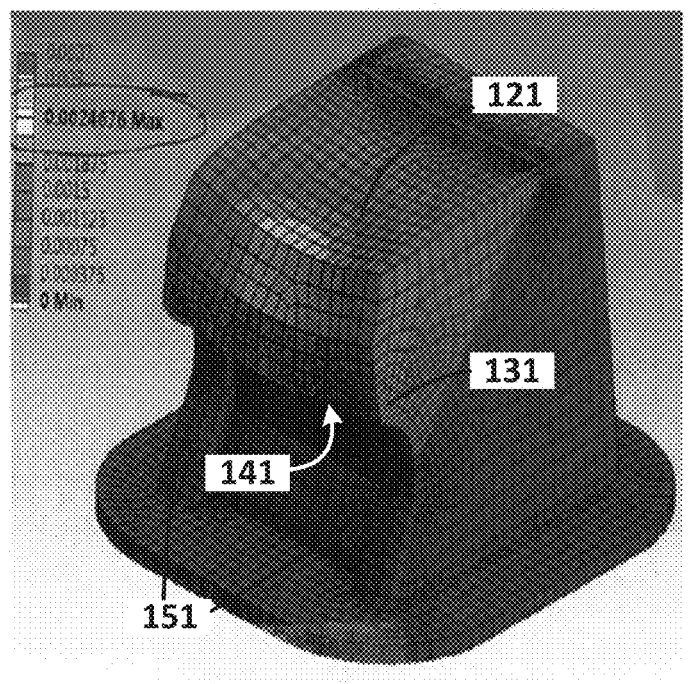
FIG. 6B is a perspective view of the locking lug of FIG. 4B, showing a finite element analysis to illustrate additional details of the locking lug in accordance with the disclosed subject matter.
Figure 7A:
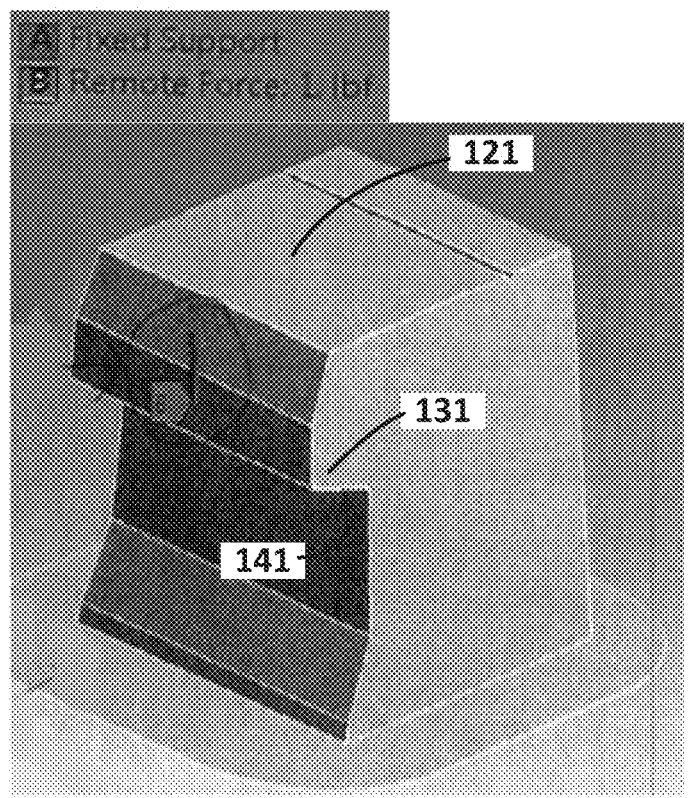
FIG. 7A is a perspective view of the locking lug of FIG. 4A, showing a finite element analysis to illustrate additional details of the locking lug in accordance with the disclosed subject matter.
Figure 7B:
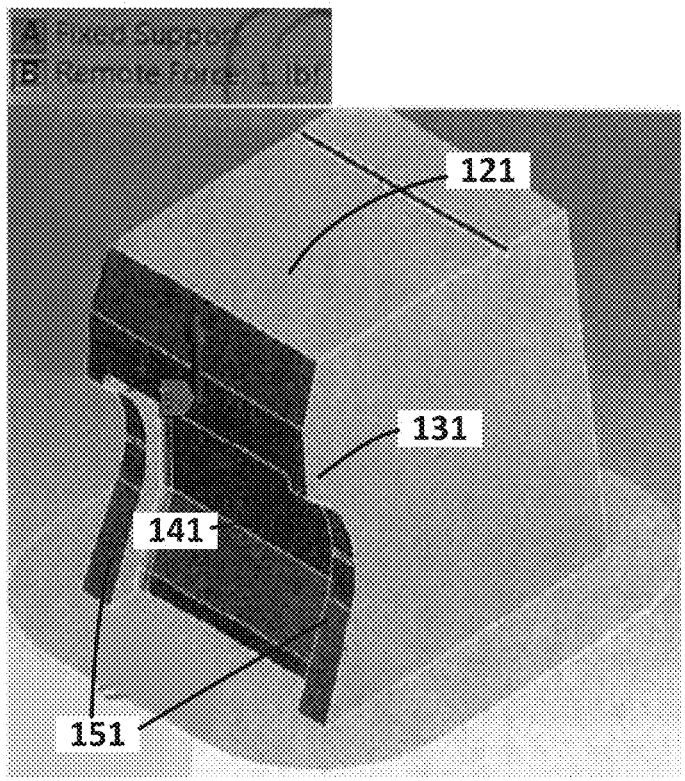
FIG. 7B is a perspective view of the locking lug of FIG. 4B, showing a finite element analysis to illustrate additional details of the locking lug in accordance with the disclosed subject matter.
Figure 8A:
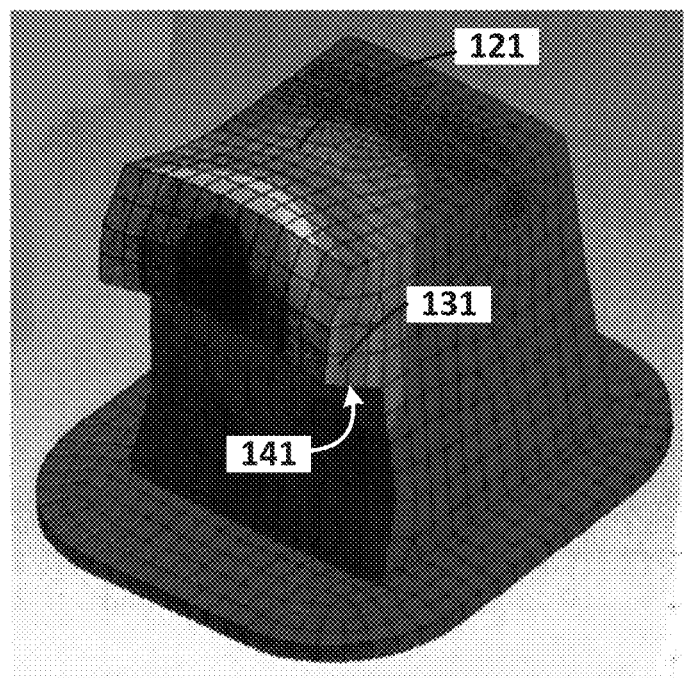
FIG. 8A is a perspective view of the locking lug of FIG. 4A, showing a finite element analysis to illustrate additional details of the locking lug in accordance with the disclosed subject matter.
Figure 8B:
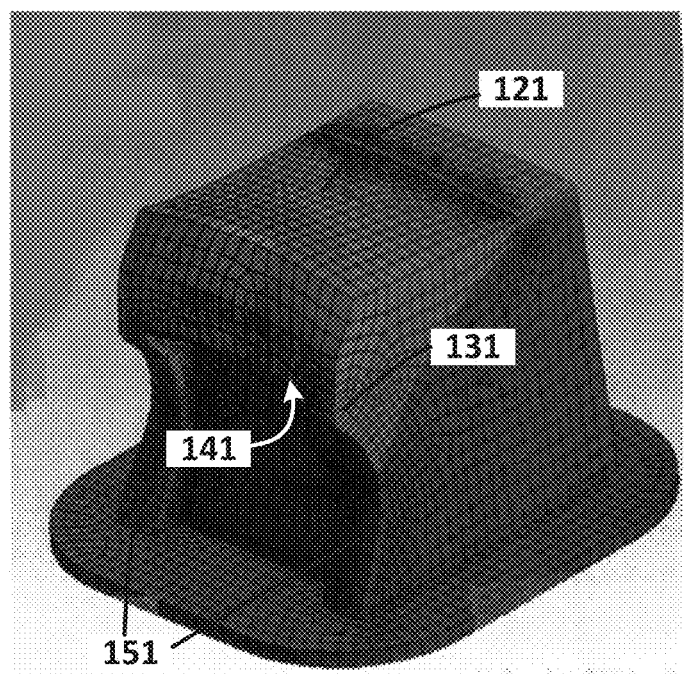
FIG. 8B is a perspective view of the locking lug of FIG. 4B, showing a finite element analysis to illustrate additional details of the locking lug in accordance with the disclosed subject matter.
Figure 9:
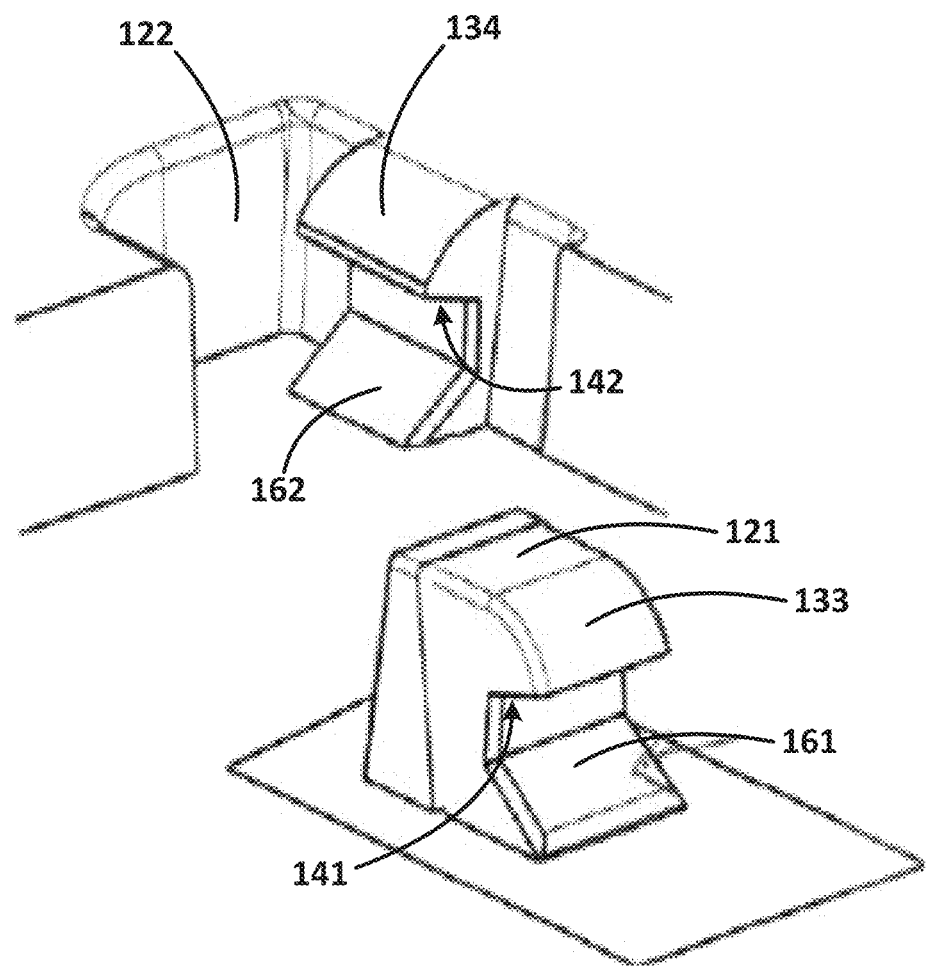
FIG. 9 is a schematic view of another exemplary embodiment of a locking lug and locking recess in accordance with the disclosed subject matter.
Figure 10:
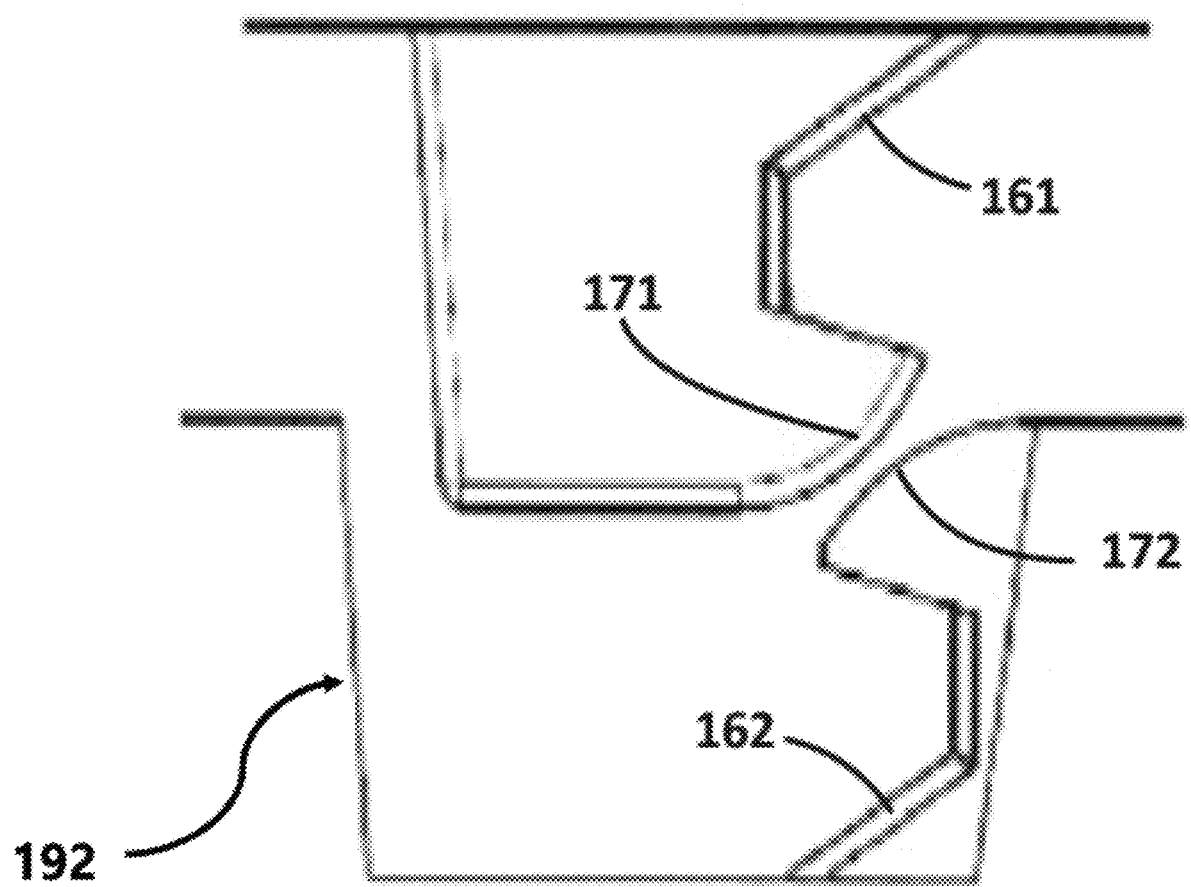
FIG. 10 is a schematic view of another exemplary embodiment of a locking lug and locking recess in accordance with the disclosed subject matter.
Figure 11B:
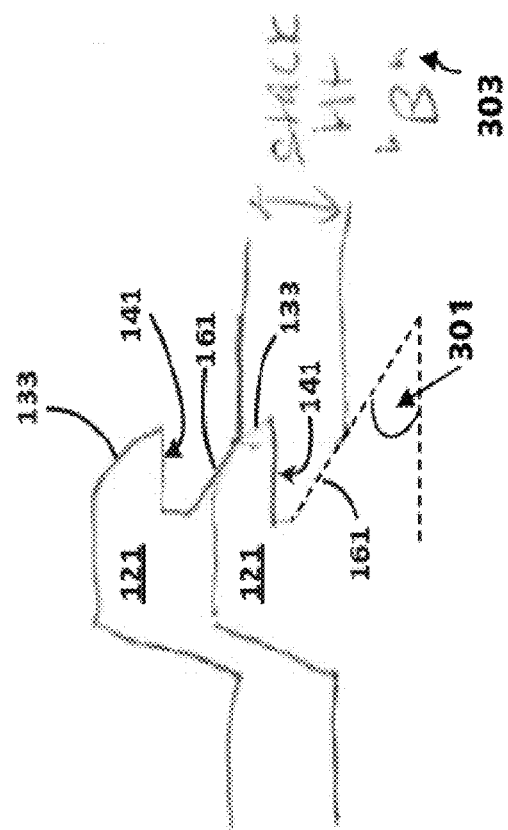
FIG. 11B is a schematic view of another exemplary embodiment of a locking lug of a container in a stacking engagement with a locking lug of another container in accordance with the disclosed subject matter.
Figure 11A:
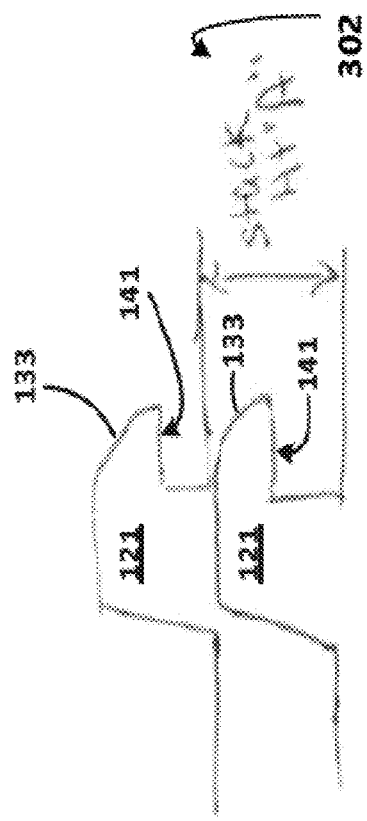
FIG. 11A is a schematic view of another exemplary embodiment of a locking lug of a container in a stacking engagement with a locking lug of another container in accordance with the disclosed subject matter.

Reference is now made to FIGS. 4A and 4B, the locking lug 121 can include stiffening ribs 151 along two sides of the locking lug 121 to provide additional support to the undercut 131, according to an aspect of the disclosed subject matter. Similarly, locking recess 122 likewise can include stiffening ribs along two sides of the locking recess. As embodied herein, both the lug and recess are provided with stiffening ribs, such that the desired minimum opening and closing forces are less sensitive to material thickness of the web since the ribs minimize deflection of the lug and recess. As additionally embodied herein, the locking lug 121 can be generally L-shaped in cross section. Furthermore, and as evident from the figures, the locking lug can be provided with a single-sided configuration, wherein a lug undercut is provided only on one side of the locking lug (e.g., on a front side of the lug). Similarly, the locking recess can be single-sided with the recess undercut on one side of the locking recess. In this manner, the locking lug and recess can be provided in a relatively small space, so as to be incorporated on containers of smaller size and reduced web thickness, without compromising the integrity of the minimum closing and opening forces as desired.

Reference is now made to FIGS. 5A-6B, a finite element test, applying a downward force to the exemplary locking lugs of FIGS. 4A and 4B, is shown for purpose of illustration and comparison, showing a locking lug 121 without stiffening ribs (FIGS. 5A and 6A) and with stiffening ribs 151 (FIGS. 5B and 6B), in accordance with the disclosed subject matter.

Reference is now made to FIGS. 7A-8B, a finite element test, applying an upward (pry-up) force to the exemplary locking lugs of FIGS. 4A and 4B, is shown for purpose of illustration and comparison, showing a locking lug 121 without stiffening ribs (FIGS. 7A and 8A) and with stiffening ribs 151 (FIGS. 7B and 8B), in accordance with the disclosed subject matter.

Reference is now made to FIGS. 9-11B, the lug undercut 131 and recess undercut 132 can define a cantilevered lug ledge and an opposing recess ledge, respectively, and each of the cantilevered lug ledge and opposing recess ledge can have an outer edge 133, 134, respectively, according to an aspect of the disclosed subject matter. As further embodied herein, outer edges 133 or 134 can be configured to reduce or maintain the minimum closing force required to move the lid into the closed position as desired. For purpose of example and not limitation, outer edges 133 or 134 can be rounded, chamfered, or chord shaped. Furthermore, and as embodied herein, locking lug 121 can include ramps 161, 162, which can allow for more efficient stacking of containers 100 when in the open position. Further referencing FIGS. 11A and 11B, Stack Height A 302 of containers 100 without ramps 161 and 162 and Stack Height B 303 of containers with ramps 161 and 162 are shown. For purpose of example and not limitation, Stack Height B 303 can be less than Stack Height A 302. As further embodied herein, ramps 161 and 162 can be formed at angle 301. For purposes of example and not limitation, containers 100 can be formed such that angle 301 is approximately 30 degrees and Stack Height B 303 is approximately 0.124 inches or less.

Figure 13A:
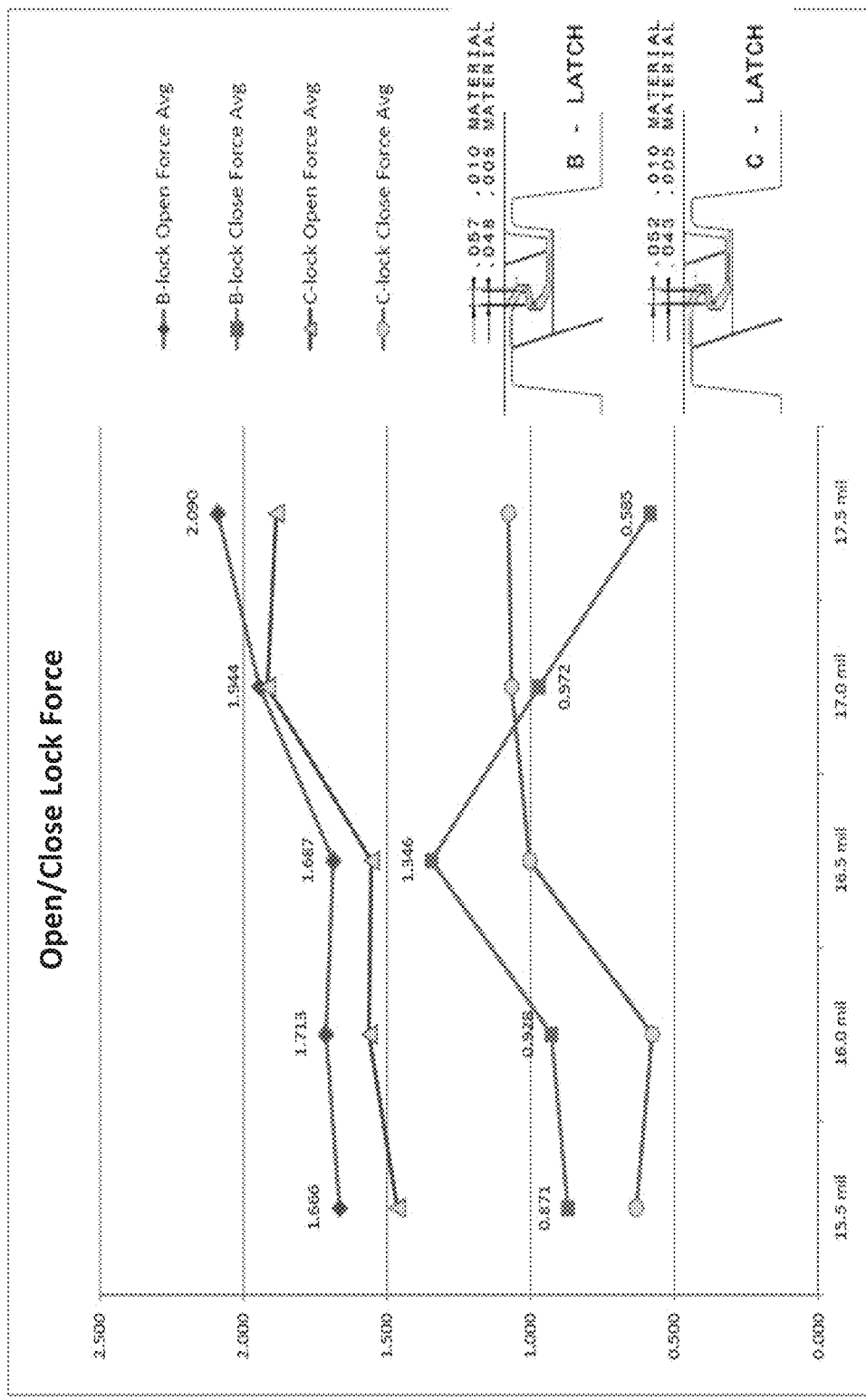
FIG. 13A is a diagram illustrating additional details of exemplary locking lugs and locking recesses, including exemplary open/close lock force, average weight and material thickness.
Figure 13B:
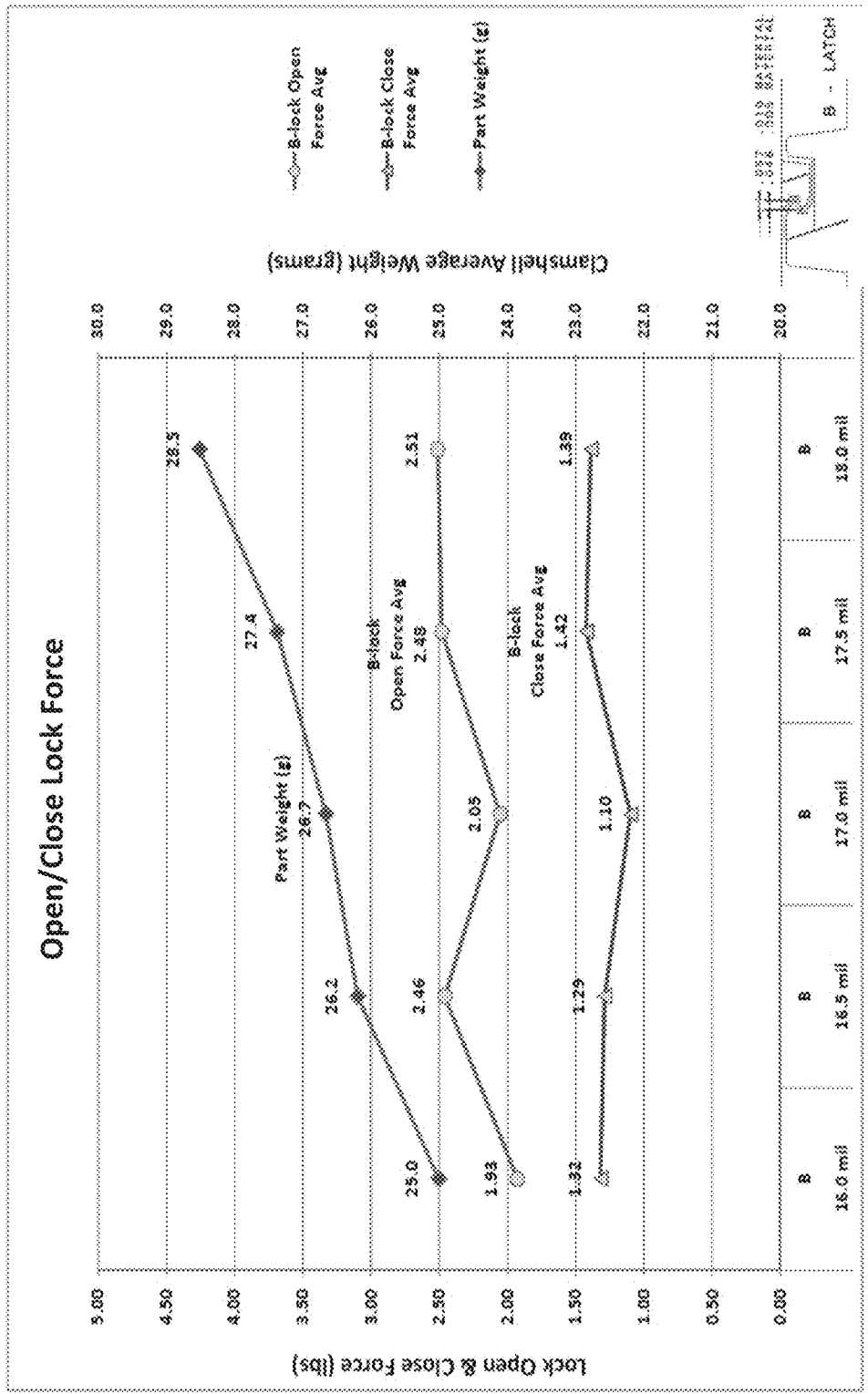
FIG. 13B is a diagram illustrating additional details of exemplary locking lugs and locking recesses, including exemplary open/close lock force, average weight and material thickness.

Reference is now made to FIGS. 13A and 13B, diagrams illustrating opening and closing forces to move the lid 102 and the base 101 between an open and closed position are provided for different material thicknesses. As shown in FIGS. 13A and 13B, a lower closing force than opening force can be achieved using the locking lugs and locking members of the disclosed subject matter, which can allow for easy filed packing, maintaining a closed container during shipping and a secure yet easy container to open when consuming the food product. FIGS. 13A and 13B further show a range of PET sheet gauges for purpose of illustration and confirmation of the disclosed subject matter. As shown, sheet gauges can be used from 18-mil down to 15.5-mil, and the containers were formed without any container stripping issues experienced with previous down gauge trials with button, bar and bone button lock geometries. The containers formed according to the disclosed subject matter can thus close easily with less than 1-lb. force, provide an audible click when the lock engages and stay securely locked with greater than 2.5 lbs. force to open.

As shown in FIG. 13A, for purpose of illustration and not limitation, opening and closing forces for exemplary containers in accordance with the disclosed subject matter are illustrated. Container B formed having a material thickness of 15.5 mil provided a closing force of about 0.871 lbs. and an opening force of about 1.666 lbs. Container B formed having a material thickness of 16.0 mil provided a closing force of about 0.928 lbs. and an opening force of about 1.713 lbs. Container B formed having a material thickness of 16.5 mil provided a closing force of about 1.346 lbs. and an opening force of about 1.687 lbs. Container B formed having a material thickness of 17.0 mil provided a closing force of about 0.972 lbs. and an opening force of about 1.944 lbs. Container B formed having a material thickness of 17.5 mil provided a closing force of about 0.585 lbs. and an opening force of about 2.090 lbs. For purpose of illustration and not limitation, an exemplary container ("container C") having a locking lug and locking recess in accordance with the disclosed subject matter. Container C formed having a material thickness of 15.5 mil provided a closing force of about 0.6 lbs. and an opening force of about 1.45 lbs. Container C formed having a material thickness of 16.0 mil provided a closing force of about 0.55 lbs. and an opening force of about 1.55 lbs. Container C formed having a material thickness of 16.5 mil provided a closing force of about 1 lb. and an opening force of about 1.55 lbs. Container C formed having a material thickness of 17.0 mil provided a closing force of about 1.1 lbs. and an opening force of about 1.9 lbs. Container C formed having a material thickness of 17.5 mil provided a closing force of about 1.15 lbs. and an opening force of about 1.8 lbs.

As shown in FIG. 13B, for purpose of illustration and not limitation, opening and closing forces for an exemplary container ("container B") in accordance with the disclosed subject matter are illustrated. Container B formed having a material thickness of 16.0 mil provided a closing force of about 1.32 lbs. and an opening force of about 1.93 lbs. Container B formed having a material thickness of 16.5 mil provided a closing force of about 1.29 lbs. and an opening force of about 2.46 lbs. Container B formed having a material thickness of 17.0 mil provided a closing force of about 1.10 lbs. and an opening force of about 2.05 lbs. Container B formed having a material thickness of 17.5 mil provided a closing force of about 1.42 lbs. and an opening force of about 2.48 lbs. Container B formed having a material thickness of 18.0 mil provided a closing force of about 1.39 lbs. and an opening force of about 2.51 lbs.

Figure 13C:
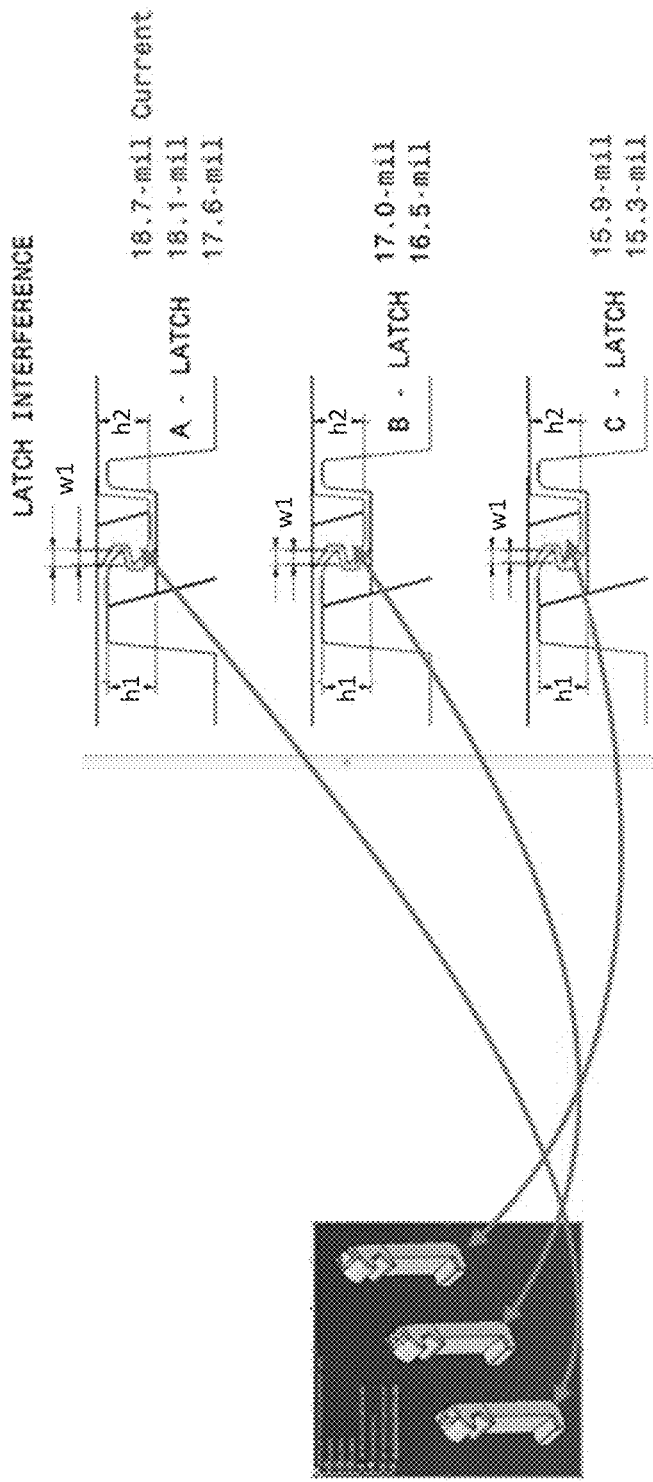
FIG. 13C is a schematic illustrating additional exemplary configurations for locking lugs and locking recesses in accordance with the disclosed subject matter.

As shown in FIG. 13C, for purpose of illustration and not limitation, exemplary locking members in accordance with the disclosed subject matter are illustrated. For example and not limitation, an exemplary locking member ("Latch A") can have an engaging surface with a dimension $w_1$ within a range of about 0.053 in to about 0.062 in. As embodied herein, Latch A can have a locking lug dimension $h_1$ of about 0.170 in and a locking lug dimension $h_2$ of about 0.180 in. For example and not limitation, an exemplary locking member ("Latch B") can have an engaging surface with a dimension $w_1$ within a range of about 0.048 in to about 0.057 in. As embodied herein, Latch B can have a locking lug dimension $h_1$ of about 1.170 in and a locking lug dimension $h_2$ of about 0.180 in. For example and not limitation, an exemplary locking member ("Latch C") can have an engaging surface with a dimension $w_1$ within a range of about 0.043 in to about 0.052 in. As embodied herein, Latch C can have a locking lug dimension $h_1$ of about 0.170 in and a locking lug dimension $h_2$ of about 0.180 in.

Hence, as evident from the above, a container having the locking lug and recess arrangement of the disclosed subject matter can be provided with reduced material web thickness and reduced flange size without compromising the integrity of the desired minimum closing and opening forces.

In accordance with another aspect of the disclosed subject matter, a method of forming a thermoformed locking assembly, or article, such as a container, having such locking assembly, is provided. The thermoformed locking assembly includes a locking lug having an undercut defining a cantilevered lug ledge having a lug engaging surface and a locking recess having an undercut defining an opposing recess ledge having a recess engaging surface and a lug stop opposite the recess undercut. The method of forming the thermoformed locking assembly includes providing a mold having a mold surface with a moveable locking lug mold portion and a moveable locking recess mold portion. The mold surface can be a single assembly with both the moveable locking lug mold portion and the moveable locking recess mold portion, or the mold surface can include separate assemblies for each of the locking lug mold portion and locking recess mold portion respectively, such as if a two-piece construction is desired. Each of the moveable locking lug mold portion and the moveable locking recess mold portion are moveable between a mold condition aligned with the mold surface and a retracted condition below the mold surface. The moveable locking lug mold portion has an upper surface with a cavity defined therein corresponding in shape to at least a portion of the locking lug. The moveable locking lug mold portion has a lug undercut mold member slidably mounted on an angled surface of the moveable locking lug mold portion with the lug undercut mold member having a flange corresponding to the lug undercut. The moveable locking recess mold portion has a protrusion extending above the mold surface when the moveable locking recess mold portion is in the mold condition. The protrusion corresponds in shape to at least a portion of the locking recess. The moveable locking recess mold portion has a recess undercut mold member slidably mounted on an angled surface of the moveable locking recess portion with the recess undercut mold member having a flange corresponding to the recess undercut.

The method further includes positioning at least one web of thermoformable material on the mold surface with the moveable locking lug mold portion and the moveable locking recess mold portion each in the mold condition, such that a first web portion is proximate the moveable locking lug mold portion and a second web portion is proximate the moveable locking recess mold portion. For example, a single web can be positioned on both the moveable locking lug mold portion and the moveable locking recess mold portion if a single piece construction is desired. Alternatively, separate webs can be positioned on the moveable locking lug mold portion and moveable locking recess mold portion respectively if a two-piece construction is preferred. As noted above, a web of reduced thickness can be used due to the mold of the disclosed subject matter. The method further includes thermoforming the at least one web to form an article including a locking lug and a locking recess. The locking lug has an undercut defining a cantilevered lug ledge having a lug engaging surface formed by the moveable locking lug mold portion. The locking recess has an undercut defining an opposing recess ledge having a recess engaging surface and a lug stop opposite the recess undercut formed by the moveable locking recess mold portion. The method further includes retracting the moveable locking lug mold portion and the moveable locking recess mold portion to the retracted condition. The lug undercut mold member slides along the angled surface of the moveable locking lug mold portion to release the lug undercut when the moveable locking lug mold portion is moved towards the retracted condition. The recess undercut mold member slides along the angled surface of the moveable locking recess mold portion to release the recess undercut when the moveable locking recess mold portion is moved towards the retracted condition.

Figure 14:
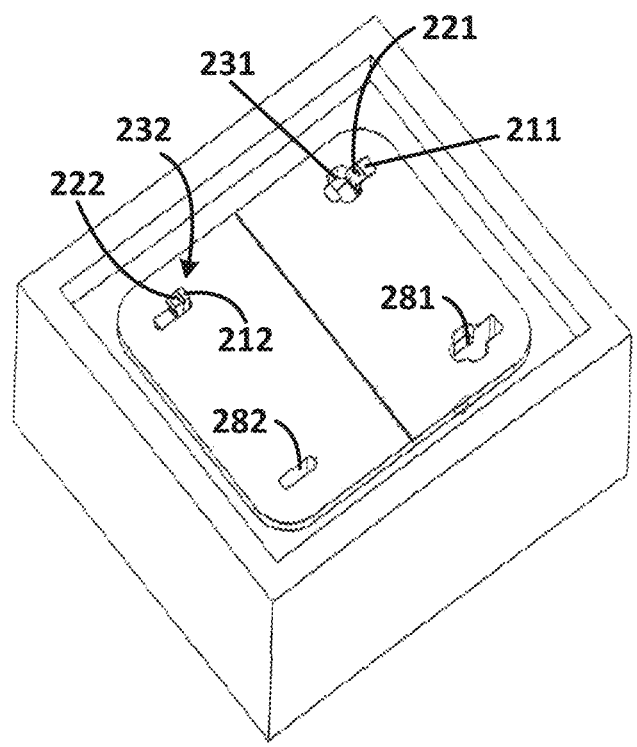
FIG. 14 is a perspective view of an exemplary mold for forming a container having a locking lug and a locking recess in accordance with the disclosed subject matter.
Figure 15A:
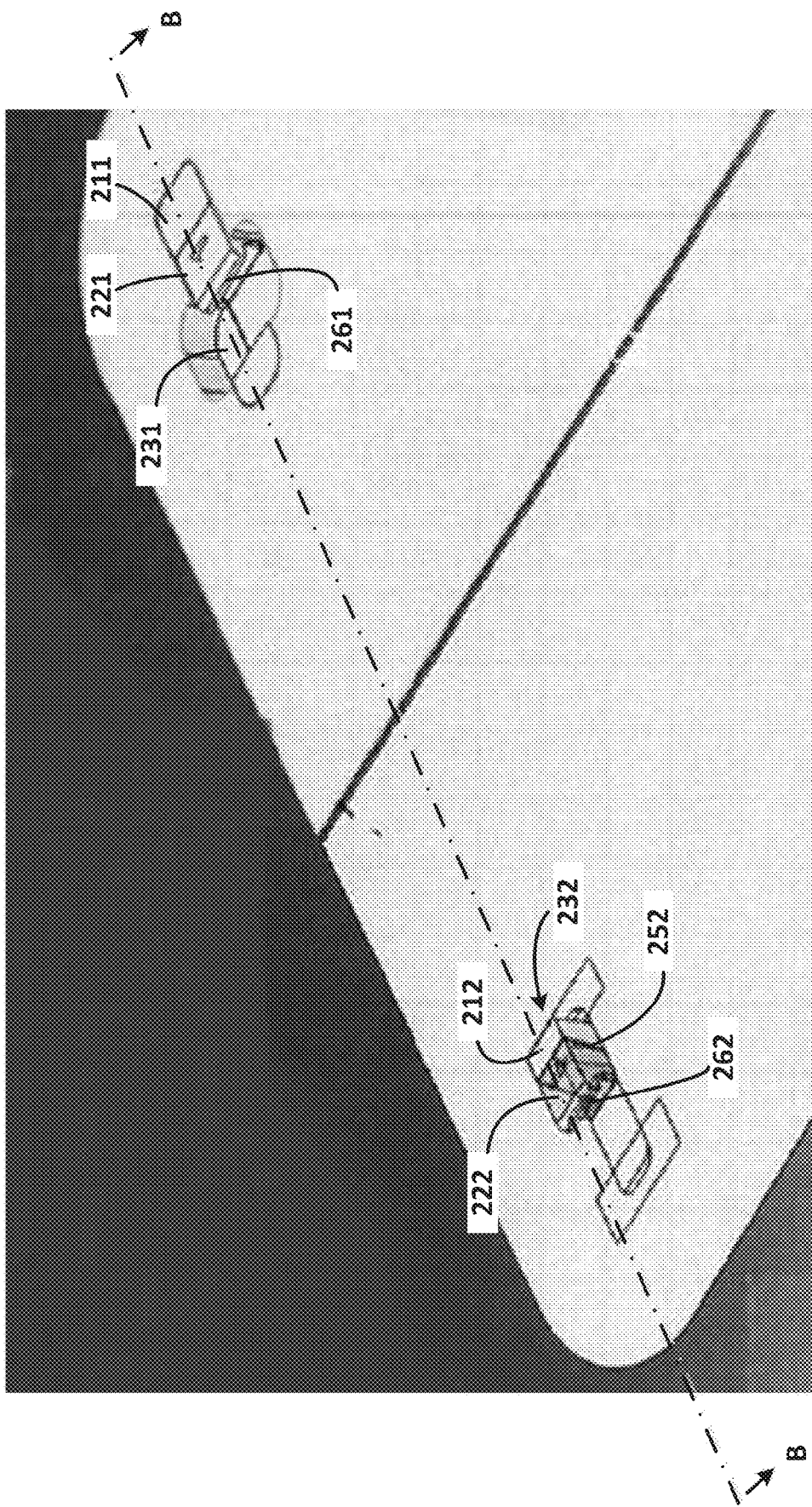
FIG. 15A is an enlarged perspective view of the exemplary mold of FIG. 14, showing additional details of a locking lug mold portion and a locking recess mold portion in accordance with the disclosed subject matter.
Figure 15B:
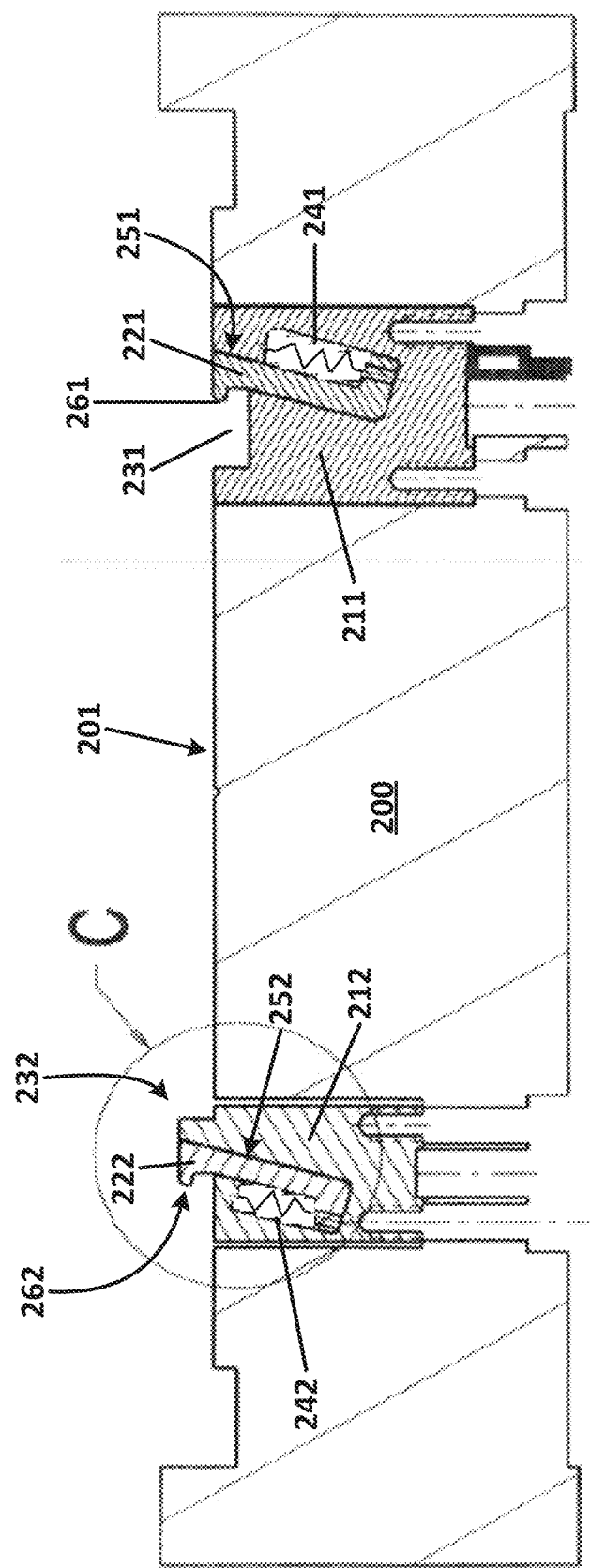
FIG. 15B is a cross-sectional view taken along line B-B of FIG. 15A.
Figure 15C:
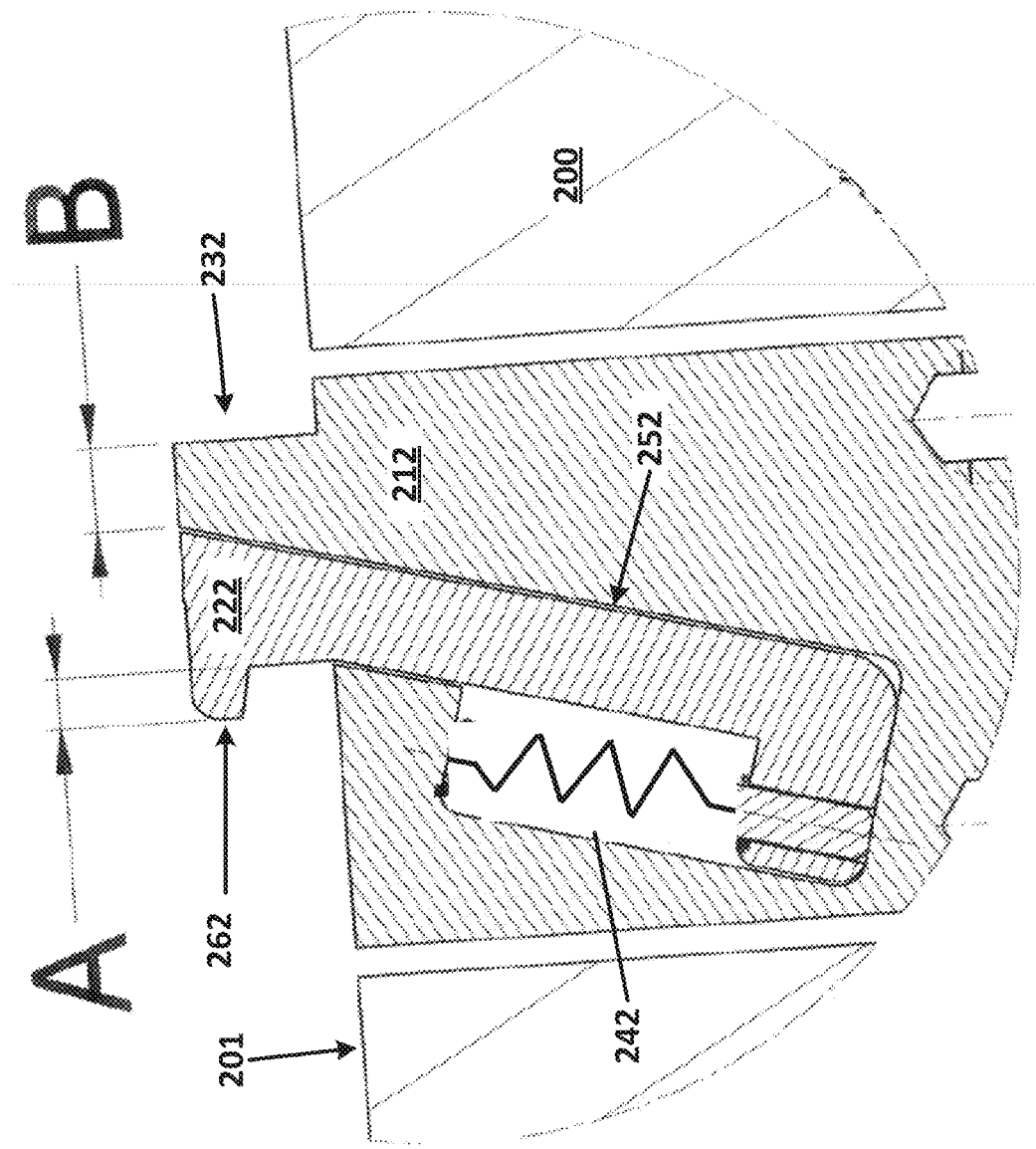
FIG. 15C is an enlarged cross-sectional view of region C of FIG. 15B.

Reference is now made to FIGS. 14-15C illustrating a mold 200 for forming the thermoformed container 100, according to an aspect of the disclosed subject matter. The mold 200 has a mold surface 201 with a moveable locking lug mold portion 211 and a moveable locking recess mold portion 212. Each of the moveable locking lug mold portion 211 and moveable locking recess mold portion 212 is moveable between a mold condition aligned with the mold surface 201 and a retracted condition below the mold surface 201. The moveable locking lug mold portion 211 has an upper surface with a cavity 231 defined therein corresponding in shape to at least a portion of the locking lug 121. The moveable locking lug mold portion 211 has a lug undercut mold member 221 slidably mounted on an angled surface 251 of the moveable locking lug mold portion 211 with the lug undercut mold member 221 having a flange 261 corresponding to the lug undercut 131.

The moveable locking recess mold portion 212 has a protrusion 232 extending above the mold surface 201 when the moveable locking recess mold portion 212 is in the mold condition. The protrusion 232 corresponds in shape to at least a portion of the locking recess 122. The moveable locking recess mold portion 212 has a recess undercut mold member 222 slidably mounted on an angled surface 252 of the moveable locking recess portion 212 with the recess undercut mold member 222 having a flange 262 corresponding to the recess undercut 132.

For purpose of illustration and not limitation, as embodied herein, a method of forming container 100 includes positioning at least one web of thermoformable material on the mold surface 201 with the moveable locking lug mold portion 211 and the moveable locking recess mold portion 212 each in the mold condition. The method includes thermoforming the at least one web to form an article including a locking lug 121 and a locking recess 122. The locking lug 121 has a lug undercut 131 defining a cantilevered lug ledge having a lug engaging surface 141 formed by the moveable locking lug mold portion 211. The locking recess 122 has a recess undercut 132 defining an opposing recess ledge having a recess engaging surface 142 and a lug stop 192 opposite the recess undercut formed by the moveable locking recess mold portion 212. The method includes retracting the moveable locking lug mold portion 211 and the moveable locking recess mold portion 212 to the retracted condition. The lug undercut mold member 221 slides along the angled surface 251 of the moveable locking lug mold portion 211 to release the lug undercut 131 when the moveable locking lug mold portion 211 is moved towards the retracted condition. The recess undercut mold member 222 slides along the angled surface 252 of the moveable locking recess mold portion 212 to release the recess undercut 132 when the moveable locking recess mold portion 212 is moved towards the retracted condition. Additional features of the locking lug and locking recess as set forth above can be incorporated with the method as desired.

Additionally, and as embodied herein, the lug undercut mold member 221 can be biased towards an initial position, and the lug undercut mold member 221 can slide along the angled surface 251 of the moveable locking lug mold portion 211 against the bias until the lug undercut 131 is released returning the lug undercut mold member 221 to the initial position. Additionally or alternatively, as embodied herein, the recess undercut mold member 222 can be biased towards an initial position, and the recess undercut mold member 222 can slide along the angled surface 252 of the moveable locking recess mold portion 212 against the bias until the recess undercut 132 is released returning the recess undercut mold member 222 to the initial position.

Furthermore, and as embodied herein, the mold 200 can include a male lock assembly pocket 282 and a female lock assembly pocket 281, which can be configured to secure the web of thermoplastic material to the mold 200.

With reference to FIG. 15C, for purpose of illustration and not limitation, the moveable locking recess mold portion 212 has a longitudinal dimension of "B" and the flange 262 of recess undercut mold member 222 has a longitudinal dimension of "A," and as embodied herein, B is greater than A.

Figure 16:
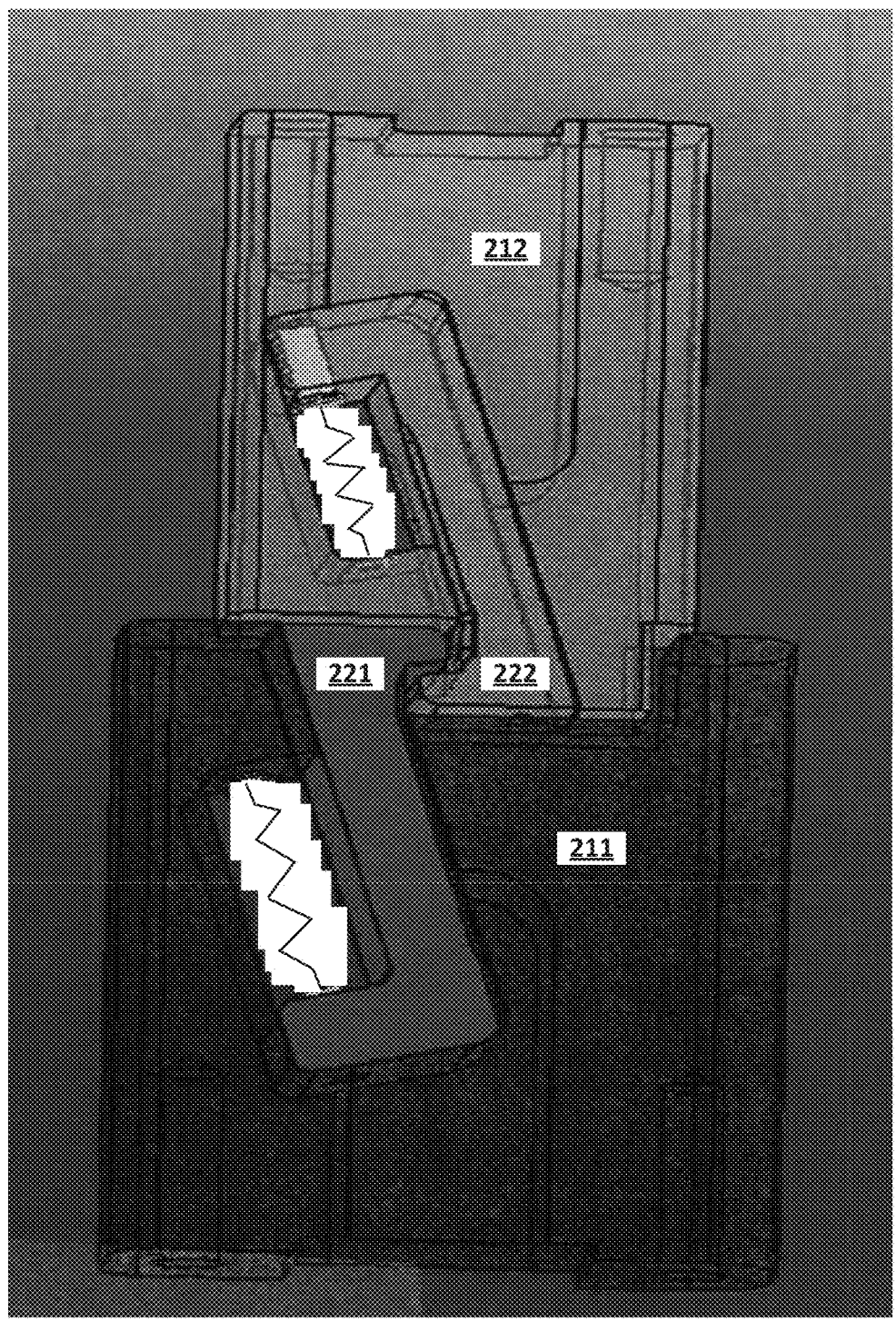
FIG. 16 is a schematic view of an exemplary locking lug mold portion and locking recess mold portion of an exemplary mold in accordance with the disclosed subject matter.

Reference is now made to FIG. 16 illustrating the moveable locking recess mold portion 212 and the moveable locking lug mold portion 211 in an engaged position, which can be used to determine tolerances for the mold 200.

For example, compact locking lugs (e.g., male locks) and locking recesses (e.g., female locks) were formed into the base and lid of a container and sized to minimally impinge on internal volume of the clamshell with sufficient engagement of the locking lug and locking recess engagement surfaces, created by undercuts in the locking lug and locking recess features, to secure the container closed after the container is filled, thus creating sufficient lock engagement to keep the container closed during handling and transportation, while still allowing the container to be opened easily. As such, a container can be formed having a minimum opening force and minimum closing force such that the minimum opening force is greater than the minimum closing force. For purposes of example and not limitation, a container so configured can allow the container to stay closed while handled and shipped to an end-user location.

Molds according to the disclosed subject matter, including the moveable locking lug mold portion and moveable locking recess mold portion, can allow the formation of a sufficient undercut in the locking lug and the locking recess while still allowing the web of thermoformed material to strip easily from the mold surface. It can be desirable to use thinner webs of thermoformable material for cost-saving purposes, however, when thinner webs are used, the locking lug and locking recess can require larger undercuts to provide more engagement between the engagement surfaces of the locking lug and locking recess to keep the container closed. This added engagement can make it difficult to remove the locking lug and locking recess from the mold at the undercuts without damaging the locks.

With the movable retracting mold geometry and mechanism as disclosed and embodied herein, the locking lug and locking recess undercuts can be removed from the mold when thinner webs are used. For example, the movable locking lug mold portion can include a lug undercut mold member that can be biased towards an initial position and that can slide along an angled surface of the moveable locking lug mold portion, which can allow the lug undercut mold member to release the web from the mold without damaging or deforming the thermoformed web. Similarly, the movable locking recess mold portion can include a recess undercut mold member that can be biased towards an initial position and that can slide along an angled surface of the moveable locking recess mold portion, which can allow the recess undercut mold member to release the web from the mold without damaging or deforming the thermoformed web.

As the geometry of the locking lug and locking recess gets smaller, it can be more difficult to form the undercut geometry, and the smaller locking lug and locking recess undercut geometry can have less engagement. As such, and as embodied herein, a stiffening rib can make thermoforming the locking lug and locking recess easier and more controllable and can provide stronger engagement as thinner webs are used for material savings purposes.

Additionally, and as embodied herein, a mold with a moveable locking lug mold portion and a moveable locking recess mold portion as described further herein can allow thermoformed locking lugs and locking recesses to be released from the mold as the moveable locking lug mold portion and moveable locking recess mold portion can retract during part ejection. For example, locking assemblies made according to the methods disclosed herein can have small geometry that can fit into a corner of a hinged container and can be easily manufactured. As further embodied herein, the moveable locking lug mold portion and moveable locking recess mold portion can release the undercuts after molding.

As embodied herein, low stack height geometry can provide high packaging cube efficiency. Additionally, and as described further herein, the locking lug and locking recess geometry can provide a differential in closing and opening force of a container such that the container can be easier to close and slightly harder to open. This can make it easier to field pack containers and close the containers under low close force. The containers can stay closed and not open during shipment, and can require additional force to open during use of the container contents.

While the disclosed subject matter is described herein in terms of certain preferred embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A thermoformed locking assembly comprising:
    a first web portion thermoformed to include a locking lug having a lug undercut defining cantilevered lug ledge having a lug engaging surface, the locking lug having a generally L-shape in cross section; and
    a second web portion thermoformed to include a locking recess having a recess undercut defining an opposing recess ledge having a recess engaging surface and a lug stop opposite the recess undercut;
    wherein the locking recess is configured to receive the locking lug and the lug stop is configured to position the locking lug in the locking recess with the lug engaging surface in engagement with the recess engaging surface when the first web portion is moved towards the second web portion, and
    the thermoformed locking assembly is configured for a minimum closing force to be applied to move the first web portion towards the second web portion so that the lug engaging surface is in engagement with the recess engaging surface, and a minimum opening force to be applied to move the lug engaging surface out of engagement with the recess engaging surface, the minimum opening force being greater than the minimum closing force.

2. The thermoformed locking assembly of claim 1, wherein the lug engaging surface has a depth of between approximately 0.043 inches and 0.063 inches.

3. The thermoformed locking assembly of claim 1, wherein the cantilevered lug ledge and the opposing recess ledge each has an outer edge, at least one outer edge being chamfered or rounded or chord shaped to reduce the minimum closing force applied to move the first web towards the second web so that the lug engaging surface is in engagement with the recess engaging surface.

4. The thermoformed locking assembly of claim 1, wherein the locking lug includes stiffening ribs along two sides of the locking lug.

5. The thermoformed locking assembly of claim 1, wherein at least one of the first web or second web comprises PET.

6. The thermoformed locking assembly of claim 1, wherein the locking lug includes a ramp configured to reduce stack height.

7. The thermoformed locking assembly of claim 1, wherein one of the first web portion and the second web portion forms at least a portion of a lid of a container and the other of the first web portion and the second web portion forms at least a portion of a base of a container.

8. The thermoformed locking assembly of claim 7, wherein the lid is hingedly connected to the base by a hinge.

9. The thermoformed locking assembly of claim 8, wherein the hinge is disposed on an opposite side of the container as the locking lug and locking recess.

10. The thermoformed locking assembly of claim 7, wherein the lid is removable from the base in the open position.

11. The thermoformed locking assembly of claim 1, wherein first web portion is thermoformed to include a plurality of locking lugs each having a lug engaging surface, and the second web portion is thermoformed to include a plurality of locking recesses each having a recess engaging surface, each locking recesses being aligned to receive a corresponding locking lug with the lug engaging surface in engagement with the recess engaging surface when the first web portion is moved towards the second web portion.

12. The thermoformed locking assembly of claim 1, wherein the first web portion and the second web portion each has a material thickness of between 15.5 mil and 18 mil.

13. A thermoformed locking assembly comprising:
    a first web portion thermoformed to include a locking lug having a lug undercut defining cantilevered lug ledge having a lug engaging surface, the locking lug having a generally L-shape in cross section; and
    a second web portion thermoformed to include a locking recess having a recess undercut defining an opposing recess ledge having a recess engaging surface and a lug stop opposite the recess undercut;
    wherein the locking recess is configured to receive the locking lug and the lug stop is configured to position the locking lug in the locking recess with the lug engaging surface in engagement with the recess engaging surface when the first web portion is moved towards the second web portion, and
    further wherein the cantilevered lug ledge and the opposing recess ledge each has an outer edge, at least one outer edge being chamfered or rounded or chord shaped to reduce a minimum closing force applied to move the first web towards the second web so that the lug engaging surface is in engagement with the recess engaging surface.

14. The thermoformed locking assembly of claim 13, wherein the lug engaging surface has a depth of between approximately 0.043 inches and 0.063 inches.

15. The thermoformed locking assembly of claim 13, further configured for a minimum opening force to be applied to move the lug engaging surface out of engagement with the recess engaging surface, the minimum opening force being greater than the minimum closing force.

16. The thermoformed locking assembly of claim 13, wherein the locking lug includes stiffening ribs along two sides of the locking lug.

17. The thermoformed locking assembly of claim 13, wherein at least one of the first web or second web comprises PET.

18. The thermoformed locking assembly of claim 13, wherein the locking lug includes a ramp configured to reduce stack height.

19. The thermoformed locking assembly of claim 13, wherein one of the first web portion and the second web portion forms at least a portion of a lid of a container and the other of the first web portion and the second web portion forms at least a portion of a base of a container.

20. The thermoformed locking assembly of claim 19, wherein the lid is hingedly connected to the base by a hinge.

21. The thermoformed locking assembly of claim 20, wherein the hinge is disposed on an opposite side of the container as the locking lug and locking recess.

22. The thermoformed locking assembly of claim 19, wherein the lid is removable from the base in the open position.

23. The thermoformed locking assembly of claim 13, wherein first web portion is thermoformed to include a plurality of locking lugs each having a lug engaging surface, and the second web portion is thermoformed to include a plurality of locking recesses each having a recess engaging surface, each locking recesses being aligned to receive a corresponding locking lug with the lug engaging surface in engagement with the recess engaging surface when the first web portion is moved towards the second web portion.

24. The thermoformed locking assembly of claim 13, wherein the first web portion and the second web portion each has a material thickness of between 15.5 mil and 18 mil.

25. A thermoformed locking assembly comprising:
a first web portion thermoformed to include a locking lug having a lug undercut defining cantilevered lug ledge having a lug engaging surface, the locking lug having a generally L-shape in cross section; and
a second web portion thermoformed to include a locking recess having a recess undercut defining an opposing recess ledge having a recess engaging surface and a lug stop opposite the recess undercut, the first web portion and the second web portion each having a material thickness of between 15.5 mil and 18 mil;
wherein the locking recess is configured to receive the locking lug and the lug stop is configured to position the locking lug in the locking recess with the lug engaging surface in engagement with the recess engaging surface when the first web portion is moved towards the second web portion.

26. The thermoformed locking assembly of claim 25, wherein the lug engaging surface has a depth of between approximately 0.043 inches and 0.063 inches.

27. The thermoformed locking assembly of claim 25, wherein one of the first web portion and the second web portion forms at least a portion of a lid of a container and the other of the first web portion and the second web portion forms at least a portion of a base of a container.

28. The thermoformed locking assembly of claim 27, wherein the lid is hingedly connected to the base by a hinge.

29. The thermoformed locking assembly of claim 28, wherein the hinge is disposed on an opposite side of the container as the locking lug and locking recess.

30. The thermoformed locking assembly of claim 27, wherein the lid is removable from the base in the open position.

31. The thermoformed locking assembly of claim 25, wherein first web portion is thermoformed to include a plurality of locking lugs each having a lug engaging surface, and the second web portion is thermoformed to include a plurality of locking recesses each having a recess engaging surface, each locking recesses being aligned to receive a corresponding locking lug with the lug engaging surface in engagement with the recess engaging surface when the first web portion is moved towards the second web portion.

\* \* \* \* \*